(12) United States Patent
Nam et al.

(10) Patent No.: US 10,951,453 B2
(45) Date of Patent: Mar. 16, 2021

(54) CONFIGURATION ASPECTS OF A TRACKING REFERENCE SIGNAL IN NEW RADIO

(71) Applicant: QUALCOMM INCORPORATED, San Diego, CA (US)

(72) Inventors: Wooseok Nam, San Diego, CA (US); Tao Luo, San Diego, CA (US); Alexandros Manolakos, San Diego, CA (US); Heechoon Lee, San Diego, CA (US); Yang Yang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/827,493

(22) Filed: Mar. 23, 2020

(65) Prior Publication Data

US 2020/0220761 A1     Jul. 9, 2020

Related U.S. Application Data

(62) Division of application No. 16/149,723, filed on Oct. 2, 2018, now Pat. No. 10,644,923.

(Continued)

(51) Int. Cl.
  *H04L 27/26* (2006.01)
  *H04L 5/00* (2006.01)
  *H04W 52/02* (2009.01)

(52) U.S. Cl.
  CPC ........ *H04L 27/2662* (2013.01); *H04L 5/0012* (2013.01); *H04L 5/0048* (2013.01);
(Continued)

(58) Field of Classification Search
  CPC ............ H04L 27/2662; H04L 27/2613; H04L 5/0012; H04L 27/2666; H04L 5/0053;
(Continued)

(56) References Cited

U.S. PATENT DOCUMENTS

| | | |
|---|---|---|
| 2013/0114535 A1 | 5/2013 | Ng et al. |
| 2015/0036616 A1 | 2/2015 | Lee et al. |

(Continued)

OTHER PUBLICATIONS

Ericsson: "On Time and Frequency Tracking of the channel", 3GPP Draft; R1-1714317 On Time and Frequency Tracking of the channel, 3rd Generation Partnership Project (3GPP), Mobile Competence Centre; 650, Route Des Lucioles; F-06921 Sophia-Antipolis Cedex; France, vol. RAN WG1, No. Prague, Czechia; Aug. 21, 2017-Aug. 25, 2017 Aug. 20, 2017, XP051317103, Retrieved from the Internet: URL:http://www.3gpp.org/ftp/Meetings_3GPP_SYNC/RAN1/Docs/ [retrieved on Aug. 20, 2017], 41 pages.

(Continued)

*Primary Examiner* — Juan A Torres
(74) *Attorney, Agent, or Firm* — QUALCOMM Incorporated

(57) ABSTRACT

Methods, systems, and devices for wireless communications are described for configuration aspects of a tracking reference signal in New Radio. A base station may select a first burst duration and a second burst duration for a tracking reference signal (TRS) burst, the first burst duration being different from the second burst duration, and may transmit configuration information indicating the first burst duration and the second burst duration to a user equipment (UE). The base station may transmit a first TRS burst having the first burst duration and a second TRS burst having the second burst duration. The UE may detect the first TRS burst having the first burst duration and the second TRS burst having the second burst duration based at least in part on the configu- (Continued)

ration information, and perform resource tracking based at least in part on the detected first TRS burst and the second TRS burst.

19 Claims, 24 Drawing Sheets

Related U.S. Application Data

(60) Provisional application No. 62/569,940, filed on Oct. 9, 2017.

(52) U.S. Cl.
CPC ........ *H04L 5/0094* (2013.01); *H04L 27/2613* (2013.01); *H04L 27/2666* (2013.01); *H04W 52/0216* (2013.01); *H04L 5/001* (2013.01)

(58) Field of Classification Search
CPC ..... H04L 5/0048; H04L 5/0023; H04L 5/001; H04L 5/0094; H04W 52/0216
USPC ........................................................ 375/260
See application file for complete search history.

(56) References Cited

U.S. PATENT DOCUMENTS

| | | |
|---|---|---|
| 2017/0208575 A1 | 7/2017 | Chen et al. |
| 2018/0270700 A1 | 9/2018 | Babaei et al. |
| 2018/0279358 A1 | 9/2018 | Babaei et al. |
| 2018/0323918 A1* | 11/2018 | Chuang ................. H04L 5/005 |
| 2019/0109750 A1 | 4/2019 | Nam et al. |
| 2020/0008228 A1* | 1/2020 | Lee ....................... H04L 5/001 |

OTHER PUBLICATIONS

International Search Report and Written Opinion—PCT/US2018/054204—ISA/EPO—dated Apr. 17, 2019.

Mediatek Inc: "On Remaining Details of TRS", 3GPP Draft; R1-1718352 On Remaining Details of TRS Final, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017 Oct. 8, 2017, XP051341535, Retrieved from the Internet: URL:http://www.3gpp.org/ftp/Meetings_3GPP_SYNC/RAN1/Docs/ [retrieved on Oct. 8, 2017], 23 pages.

Mediatek Inc: "On TRS design", 3GPP Draft; R1-1713713 on TRS DESIGN_FINAL, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017 Aug. 20, 2017, XP051316512, Retrieved from the Internet: URL:http://www.3gpp.org/ftp/Meetings_3GPP_SYNC/RAN1/Docs/ [retrieved on Aug. 20, 2017], 14 pages.

Partial International Search Report—PCT/US2018/054204—ISA/EPO—dated Jan. 18, 2019.

Samsung: "Discussions on Fine Time/Frequency Tracking for NR", 3GPP Draft; R1-1702963 Tracking RS for NR, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017 Feb. 12, 2017, XP051210106, Retrieved from the Internet: URL:http://www.3gpp.org/ftp/Meeting_3GPP_SYNC/RAN1/Docs/ [retrieved on Feb. 12, 2017], 4 pages.

* cited by examiner

CONFIGURATION ASPECTS OF A TRACKING REFERENCE SIGNAL IN NEW RADIO

CROSS REFERENCES

The present Application for Patent is a Divisional of U.S. patent application Ser. No. 16/149,723 by NAM, et al., entitled "CONFIGURATION ASPECTS OF A TRACKING REFERENCE SIGNAL IN NEW RADIO," filed Oct. 2, 2018, which claims the benefit of U.S. Provisional Patent Application No. 62/569,940 by NAM, et al., entitled "CONFIGURATION ASPECTS OF A TRACKING REFERENCE SIGNAL IN NEW RADIO," filed Oct. 9, 2017, assigned to the assignee hereof, and expressly incorporated herein.

BACKGROUND

The following relates generally to wireless communication, and more specifically to configuration aspects of a tracking reference signal in New Radio.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communications systems seek to maintain time and frequency synchronization to permit communication between communication devices, including base stations and UEs. In LTE, a base station transmits a cell-specific reference signal in every slot and resource block, and a UE within range of the base station may perform time tracking, frequency tracking, or both, using a received cell-specific reference signal to maintain time and frequency synchronization with the base station. NR systems do not similarly transmit a cell-specific reference signal in every slot and resource block. Instead, a base station in NR systems may transmit a tracking reference signal that a UE may use for time tracking, frequency tracking, or both. Conventional tracking reference signal transmission techniques fail to adequately balance trade-offs between time tracking and frequency tracking, resulting in degraded time and frequency synchronization, lower channel throughput due to increased tracking reference signal overhead, or the like.

SUMMARY

The described techniques relate to improved methods, systems, devices, or apparatuses that support configuration aspects of a tracking reference signal in New Radio. Generally, the described techniques provide a tracking reference signal (TRS) configuration that enables a user equipment (UE) to maintain time and frequency synchronization with a base station, while also decreasing overhead resulting from transmission of TRS bursts. A TRS is a multi-purpose reference signal that may be used for time tracking, frequency tracking, or the like. The TRS configuration described herein may support multiple different uses to enable the UE to maintain time and frequency synchronization with a base station.

In some examples, a duration (e.g., length) of a TRS burst may be varied in a TRS configuration to enhance resource tracking. For example, a base station may select a set of burst durations (or lengths) for a TRS burst, including a first burst duration and a second burst duration, the first burst duration being different from the second burst duration. The base station may transmit configuration information indicating the set of burst durations to a UE. The base station may transmit a first TRS burst having the first burst duration and a second TRS burst having the second burst duration. The UE may detect the first TRS burst having the first burst duration and the second TRS burst having the second burst duration based at least in part on the configuration information, and the UE may perform resource tracking based at least in part on the detected first TRS burst and the second TRS burst. In some cases, the resource tracking may be time tracking to maintain time synchronization, frequency tracking to maintain frequency synchronization, or the like.

In some examples, a frequency offset of a TRS transmission may be varied in a TRS configuration to enhance resource tracking. For example, a base station may select a frequency offset parameter. The frequency offset parameter may indicate an offset relative to a reference frequency, and may be expressed in terms of a number of resource elements, a frequency band, a frequency bandwidth part, or the like. In some cases, the offset may be indicated for a set of symbol indexes within a particular transmission time interval (e.g., within a slot), and the frequency offset parameter may specify an offset value for each symbol index in the set of symbol indexes. The base station may transmit configuration information to a UE indicating the frequency offset parameter, and the UE may receive the configuration information. The base station may transmit a TRS transmission having a frequency offset corresponding to the frequency offset parameter. The UE may detect the TRS transmission within a frequency band based at least in part on the frequency offset parameter, and perform resource tracking based at least in part on the detected TRS transmission.

A method of wireless communication is described. The method may include receiving configuration information indicating a first burst duration and a second burst duration for a TRS burst, the first burst duration being different from the second burst duration, detecting a first TRS burst having the first burst duration and a second TRS burst having the second burst duration based at least in part on the configuration information, and performing resource tracking based at least in part on the detected first TRS burst and the second TRS burst.

An apparatus for wireless communication is described. The apparatus may include means for receiving configuration information indicating a first burst duration and a second burst duration for a TRS burst, the first burst duration being different from the second burst duration, means for detecting a first TRS burst having the first burst duration and a second TRS burst having the second burst duration based at least in part on the configuration information, and means for performing resource tracking based at least in part on the detected first TRS burst and the second TRS burst.

Another apparatus for wireless communication is described. The apparatus may include a processor, memory in electronic communication with the processor, and instructions stored in the memory. The instructions may be operable to cause the processor to receive configuration information indicating a first burst duration and a second burst duration for a TRS burst, the first burst duration being different from the second burst duration, detect a first TRS burst having the first burst duration and a second TRS burst having the second burst duration based at least in part on the configuration information, and perform resource tracking based at least in part on the detected first TRS burst and the second TRS burst.

A non-transitory computer-readable medium for wireless communication is described. The non-transitory computer-readable medium may include instructions operable to cause a processor to receive configuration information indicating a first burst duration and a second burst duration for a TRS burst, the first burst duration being different from the second burst duration, detect a first TRS burst having the first burst duration and a second TRS burst having the second burst duration based at least in part on the configuration information, and perform resource tracking based at least in part on the detected first TRS burst and the second TRS burst.

Some examples of the method, apparatus, and non-transitory computer-readable medium described above may further include processes, features, means, or instructions for determining, from the configuration information, that the first burst duration corresponds to a first time interval and the second burst duration corresponds to a second time interval, the second time interval occurring after the first time interval.

Some examples of the method, apparatus, and non-transitory computer-readable medium described above may further include processes, features, means, or instructions for determining, from the configuration information, that transmissions of TRS bursts may be scheduled to alternate between the first burst duration and the second burst duration in each time interval of a plurality of time intervals.

Some examples of the method, apparatus, and non-transitory computer-readable medium described above may further include processes, features, means, or instructions for determining, from the configuration information, that a first resource and a second resource may have been allocated to the UE, wherein the first burst duration corresponds to the first resource and the second burst duration corresponds to the second resource.

In some examples of the method, apparatus, and non-transitory computer-readable medium described above, determining, from the configuration information, a periodicity of a time interval and a time offset, wherein detecting the first TRS burst having the first burst duration and the second TRS burst having the second burst duration includes monitoring, within each instance of the time interval, for a TRS burst having the first burst duration at a first location and for a TRS burst having the second burst duration at a second location corresponding to the offset.

Some examples of the method, apparatus, and non-transitory computer-readable medium described above may further include processes, features, means, or instructions for determining that the first resource may be scheduled to collide with the second resource during a transmission time interval (TTI).

Some examples of the method, apparatus, and non-transitory computer-readable medium described above may further include processes, features, means, or instructions for determining, based at least in part on the configuration information or a rule, a priority order of the first resource relative to the second resource. Some examples of the method, apparatus, and non-transitory computer-readable medium described above may further include processes, features, means, or instructions for monitoring for one of the first TRS burst or the second TRS burst within the TTI based at least in part on the priority order.

Some examples of the method, apparatus, and non-transitory computer-readable medium described above may further include processes, features, means, or instructions for determining, from the configuration information, at least one TRS parameter, wherein the at least one TRS parameter is one or more of a TRS burst duration parameter, a TRS burst periodicity parameter, an aspect of a TRS tone, a TRS symbol spacing parameter, a TRS number parameter, an offset parameter, and a TRS bandwidth parameter.

Some examples of the method, apparatus, and non-transitory computer-readable medium described above may further include processes, features, means, or instructions for determining, from the configuration information, a plurality of burst durations and a corresponding time interval duration for each of the plurality of burst durations, the plurality of burst durations including the first and second burst durations. Some examples of the method, apparatus, and non-transitory computer-readable medium described above may further include processes, features, means, or instructions for monitoring for a plurality of TRS bursts based at least in part on the plurality of burst durations and the corresponding time interval durations, the plurality of TRS bursts including the first and second TRS bursts.

Some examples of the method, apparatus, and non-transitory computer-readable medium described above may further include processes, features, means, or instructions for determining, from the configuration information, a frequency offset parameter. Some examples of the method, apparatus, and non-transitory computer-readable medium described above may further include processes, features, means, or instructions for monitoring for the first TRS burst based at least in part on the frequency offset parameter.

Some examples of the method, apparatus, and non-transitory computer-readable medium described above may further include processes, features, means, or instructions for determining, from the configuration information, tone spacing, wherein monitoring for the first TRS burst may be based at least in part on the tone spacing.

A method of wireless communication is described. The method may include selecting a first burst duration and a second burst duration for a TRS burst, the first burst duration being different from the second burst duration, transmitting configuration information indicating the first burst duration and the second burst duration, and transmitting a first TRS burst having the first burst duration and a second TRS burst having the second burst duration.

An apparatus for wireless communication is described. The apparatus may include means for selecting a first burst duration and a second burst duration for a TRS burst, the first burst duration being different from the second burst duration, means for transmitting configuration information indicating the first burst duration and the second burst duration, and means for transmitting a first TRS burst having the first burst duration and a second TRS burst having the second burst duration.

Another apparatus for wireless communication is described. The apparatus may include a processor, memory in electronic communication with the processor, and instructions stored in the memory. The instructions may be operable to cause the processor to select a first burst duration and a second burst duration for a TRS burst, the first burst duration being different from the second burst duration, transmit configuration information indicating the first burst duration and the second burst duration, and transmit a first TRS burst having the first burst duration and a second TRS burst having the second burst duration.

A non-transitory computer-readable medium for wireless communication is described. The non-transitory computer-readable medium may include instructions operable to cause a processor to select a first burst duration and a second burst duration for a TRS burst, the first burst duration being different from the second burst duration, transmit configuration information indicating the first burst duration and the second burst duration, and transmit a first TRS burst having the first burst duration and a second TRS burst having the second burst duration.

In some examples of the method, apparatus, and non-transitory computer-readable medium described above, transmitting the first TRS burst and the second TRS burst includes alternating between transmitting the first TRS burst and the second TRS burst in each time interval of a plurality of time intervals.

Some examples of the method, apparatus, and non-transitory computer-readable medium described above may further include processes, features, means, or instructions for allocating a first resource and a second resource to the UE, wherein the configuration information indicates that each of the first resource and the second resource may have been allocated to the UE.

Some examples of the method, apparatus, and non-transitory computer-readable medium described above may further include processes, features, means, or instructions for determining a time offset between the first resource and the second resource, wherein the configuration information indicates the time offset.

Some examples of the method, apparatus, and non-transitory computer-readable medium described above may further include processes, features, means, or instructions for determining a priority order of the first resource relative to the second resource, wherein the configuration information indicates the priority order.

Some examples of the method, apparatus, and non-transitory computer-readable medium described above may further include processes, features, means, or instructions for determining a plurality of burst durations and a corresponding time interval duration (e.g., a corresponding time interval length) for each of the plurality of burst durations, the plurality of burst durations including the first and second burst durations, wherein the configuration information indicates the plurality of burst durations and the corresponding time interval durations.

A method of wireless communication is described. The method may include receiving configuration information indicating a frequency offset parameter, detecting a TRS transmission within a frequency band based at least in part on the frequency offset parameter, and performing resource tracking based at least in part on the detected TRS transmission.

An apparatus for wireless communication is described. The apparatus may include means for receiving configuration information indicating a frequency offset parameter, means for detecting a TRS transmission within a frequency band based at least in part on the frequency offset parameter, and means for performing resource tracking based at least in part on the detected TRS transmission.

Another apparatus for wireless communication is described. The apparatus may include a processor, memory in electronic communication with the processor, and instructions stored in the memory. The instructions may be operable to cause the processor to receive configuration information indicating a frequency offset parameter, detect a TRS transmission within a frequency band based at least in part on the frequency offset parameter, and perform resource tracking based at least in part on the detected TRS transmission.

A non-transitory computer-readable medium for wireless communication is described. The non-transitory computer-readable medium may include instructions operable to cause a processor to receive configuration information indicating a frequency offset parameter, detect a TRS transmission within a frequency band based at least in part on the frequency offset parameter, and perform resource tracking based at least in part on the detected TRS transmission.

Some examples of the method, apparatus, and non-transitory computer-readable medium described above may further include processes, features, means, or instructions for determining, from the configuration information, tone spacing. Some examples of the method, apparatus, and non-transitory computer-readable medium described above may further include processes, features, means, or instructions for processing the frequency offset parameter and the tone spacing to determine a location of at least one TRS tone of the TRS transmission within the frequency band relative to a reference frequency.

Some examples of the method, apparatus, and non-transitory computer-readable medium described above may further include processes, features, means, or instructions for processing the frequency offset parameter to determine a first offset value corresponding to a first TTI and a second offset value corresponding to a second TTI. Some examples of the method, apparatus, and non-transitory computer-readable medium described above may further include processes, features, means, or instructions for monitoring for a TRS tone of the TRS transmission within the first TTI corresponding to the first offset value and for a TRS tone of the TRS transmission within the second TTI corresponding to the second offset value.

In some examples of the method, apparatus, and non-transitory computer-readable medium described above, the frequency offset parameter indicates an offset in a number of resource elements.

In some examples of the method, apparatus, and non-transitory computer-readable medium described above, the frequency offset parameter indicates a bandwidth part of a plurality of different bandwidth parts within a system bandwidth.

Some examples of the method, apparatus, and non-transitory computer-readable medium described above may further include processes, features, means, or instructions for determining, from the configuration information, a first burst duration and a second burst duration for the TRS transmission. Some examples of the method, apparatus, and non-transitory computer-readable medium described above may further include processes, features, means, or instructions for monitoring for the TRS transmission having the first burst duration and a second TRS transmission having the second burst duration based at least in part on the configuration information.

Some examples of the method, apparatus, and non-transitory computer-readable medium described above may further include processes, features, means, or instructions for determining, from the frequency offset parameter, an offset value for a plurality of symbol indexes. Some examples of the method, apparatus, and non-transitory computer-readable medium described above may further include processes, features, means, or instructions for monitoring, at a plurality of respective symbol periods corresponding to the plurality of symbol indexes, for a TRS tone of the TRS transmission.

A method of wireless communication is described. The method may include selecting a frequency offset parameter, transmitting configuration information indicating the frequency offset parameter, and transmitting a TRS transmission having a frequency offset corresponding to the frequency offset parameter.

An apparatus for wireless communication is described. The apparatus may include means for selecting a frequency offset parameter, means for transmitting configuration information indicating the frequency offset parameter, and means for transmitting a TRS transmission having a frequency offset corresponding to the frequency offset parameter.

Another apparatus for wireless communication is described. The apparatus may include a processor, memory in electronic communication with the processor, and instructions stored in the memory. The instructions may be operable to cause the processor to select a frequency offset parameter, transmit configuration information indicating the frequency offset parameter, and transmit a TRS transmission having a frequency offset corresponding to the frequency offset parameter.

A non-transitory computer-readable medium for wireless communication is described. The non-transitory computer-readable medium may include instructions operable to cause a processor to select a frequency offset parameter, transmit configuration information indicating the frequency offset parameter, and transmit a TRS transmission having a frequency offset corresponding to the frequency offset parameter.

Some examples of the method, apparatus, and non-transitory computer-readable medium described above may further include processes, features, means, or instructions for determining tone spacing for the TRS transmission, wherein the configuration information indicates the tone spacing.

In some examples of the method, apparatus, and non-transitory computer-readable medium described above, determining a first offset value corresponding to a first TTI and a second offset value corresponding to a second TTI, wherein the frequency offset parameter indicates the first offset value and the second offset value, wherein transmitting the TRS transmission includes transmitting a TRS tone of the TRS transmission within the first TTI corresponding to the first offset value and a TRS tone of the TRS transmission within the second TTI corresponding to the second offset value.

In some examples of the method, apparatus, and non-transitory computer-readable medium described above, the frequency offset parameter indicates an offset in a number of resource elements.

In some examples of the method, apparatus, and non-transitory computer-readable medium described above, the frequency offset parameter indicates a bandwidth part of a plurality of different bandwidth parts within a system bandwidth.

Some examples of the method, apparatus, and non-transitory computer-readable medium described above may further include processes, features, means, or instructions for determining an offset value for a plurality of symbol indexes, wherein the configuration information indicates the plurality of symbol indexes.

DETAILED DESCRIPTION

Figure 1:
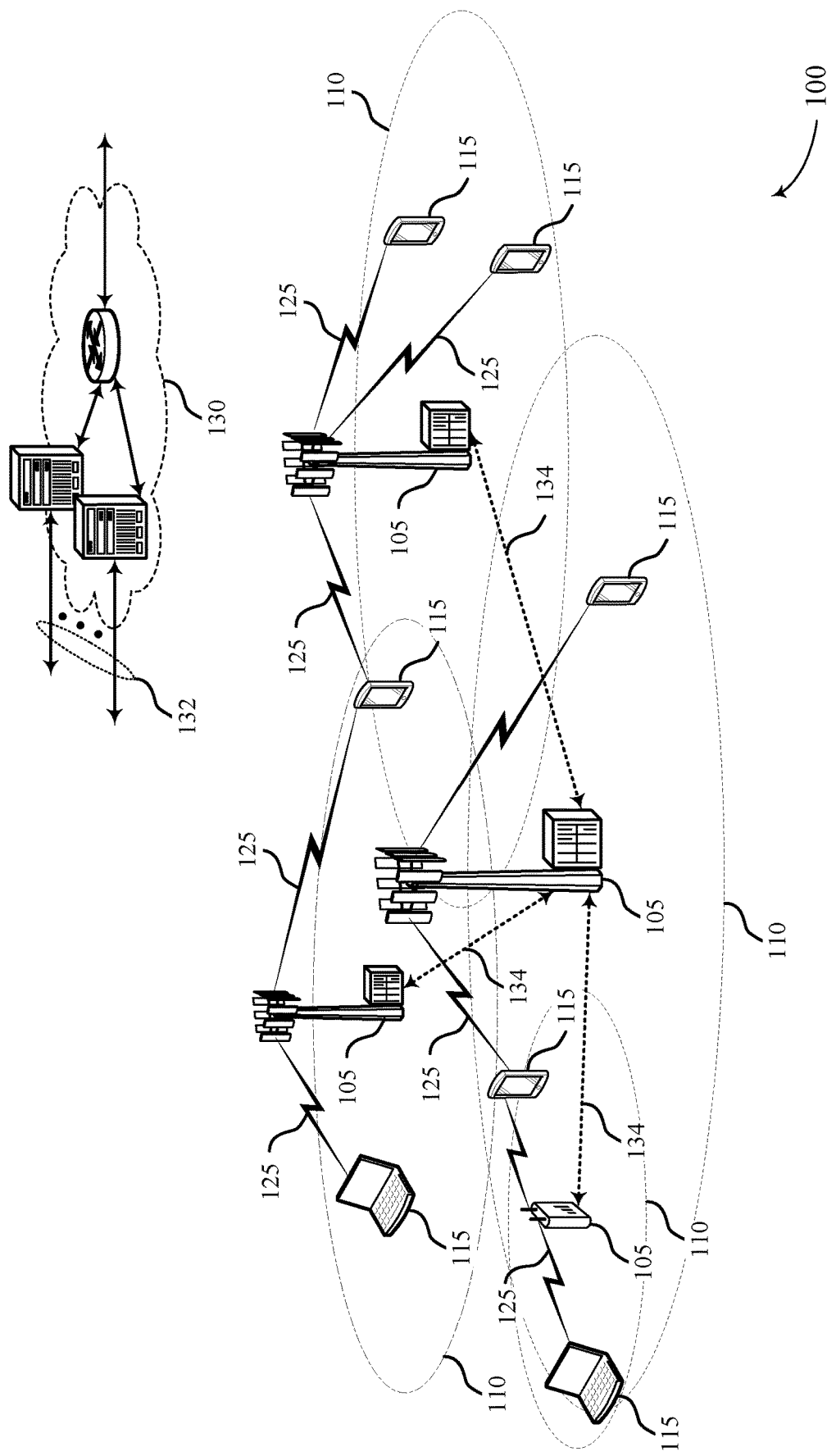
FIG. 1 illustrates an example of a system for wireless communications that supports configuration aspects of a tracking reference signal in New Radio in accordance with aspects of the present disclosure.

The described techniques relate to improved methods, systems, devices, or apparatuses that support configuration aspects of a tracking reference signal in New Radio. A tracking reference signal (TRS) may be configured to enable a user equipment (UE) to maintain time and frequency synchronization with a base station, while also decreasing overhead resulting from transmission of TRS bursts. The TRS may be used for time tracking, frequency tracking, or the like. The TRS configuration described herein may support multiple different uses to enable the UE to maintain time and frequency synchronization with a base station. In some cases, TRS can be configured with higher-layer signaling in a device-specific manner. For some receivers (e.g., advanced receivers), the UE may use TRS for purposes in addition to time and/or frequency tracking, including estimation of Doppler spread, delay spread, power delay profile, or the like.

In some examples, a duration (e.g., length) of a TRS burst may be varied in a TRS configuration to enhance resource tracking. For example, a base station may select a set of burst durations (e.g., a set of burst lengths) for a TRS burst, including a first burst duration and a second burst duration, where the first burst duration is different from the second burst duration. The base station may transmit configuration information indicating the set of burst durations to a UE. The base station may transmit a first TRS burst having the first burst duration and a second TRS burst having the second burst duration. The UE may detect the first TRS burst having the first burst duration and the second TRS burst having the second burst duration based at least in part on the configuration information, and the UE may perform resource tracking based at least in part on the detected first TRS burst and the second TRS burst. In some cases, the resource tracking may be time tracking to maintain time synchronization, frequency tracking to maintain frequency synchronization, or the like.

In some examples, a frequency offset of a TRS transmission may be varied in a TRS configuration to enhance resource tracking. For example, a base station may select a frequency offset parameter. The frequency offset parameter may indicate an offset relative to a reference frequency, and may be expressed in terms of a number of resource elements, a frequency band, a frequency bandwidth part, or the like. In some cases, the offset may be indicated for a set of symbol indexes within a particular transmission time interval (e.g., within a slot), and the frequency offset parameter may specify an offset value for each symbol index in the set of symbol indexes. The base station may transmit configuration information to a UE indicating the frequency offset parameter, and the UE may receive the configuration information. The base station may transmit a TRS transmission having a frequency offset corresponding to the frequency offset parameter. The UE may detect the TRS transmission within a frequency band based at least in part on the frequency offset parameter, and perform resource tracking based at least in part on the detected TRS transmission.

Aspects of the disclosure are initially described in the context of a wireless communications system. The wireless communications system may configure a TRS to enhance the ability of a UE to maintain time and frequency synchronization with a base station, while also decreasing overhead resulting from transmission of TRS bursts. Aspects of the disclosure are further illustrated by and described with reference to apparatus diagrams, system diagrams, and flowcharts that relate to configuration aspects of a tracking reference signal in New Radio.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both types of duplexing.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report an indication of the signal it received with a highest signal quality, or an otherwise acceptable signal quality, to the base station 105. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., poor signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

The wireless communications system 100 may configure a TRS to enable a UE 115 to maintain time and frequency synchronization with a base station, while also decreasing overhead resulting from transmission of TRS bursts. A base station 105 may specify a TRS burst pattern configuration to indicate which slots include a TRS burst, and a set of resource elements of a TRS frequency band (e.g., one or more resource blocks) that include TRS tones. For example, base station 105 may select a set of burst durations for a TRS burst, including a first burst duration and a second burst duration, where the first burst duration is different from the second burst duration. The base station 105 may transmit configuration information to the UE 115 indicating the set of burst durations. The base station 105 may transmit a first TRS burst having the first burst duration and a second TRS burst having the second burst duration. The UE 115 may detect the first TRS burst having the first burst duration and the second TRS burst having the second burst duration based at least in part on the configuration information, and perform resource tracking based at least in part on the detected first TRS burst and the second TRS burst. The resource tracking may be time tracking for maintain time synchronization, frequency tracking for maintaining frequency synchronization, or the like.

In some examples, a base station 105 may select a frequency offset parameter for a TRS transmission. The frequency offset parameter may indicate an offset relative to a reference frequency, and may be expressed in terms of a number of resource elements, a frequency band, a frequency bandwidth part, or the like. In some cases, the offset may be indicated for a set of symbol indexes within a particular transmission time interval (e.g., within a slot), and the frequency offset parameter may specify an offset value for each symbol index in the set of symbol indexes. The base station 105 may transmit configuration information to a UE 115 indicating the frequency offset parameter, and the UE 115 may receive the configuration information. The base station 105 may transmit a TRS transmission having a frequency offset corresponding to the frequency offset parameter. The UE 115 may detect the TRS transmission within a frequency band based at least in part on the frequency offset parameter, and perform resource tracking based at least in part on the detected TRS transmission.

Figure 2:
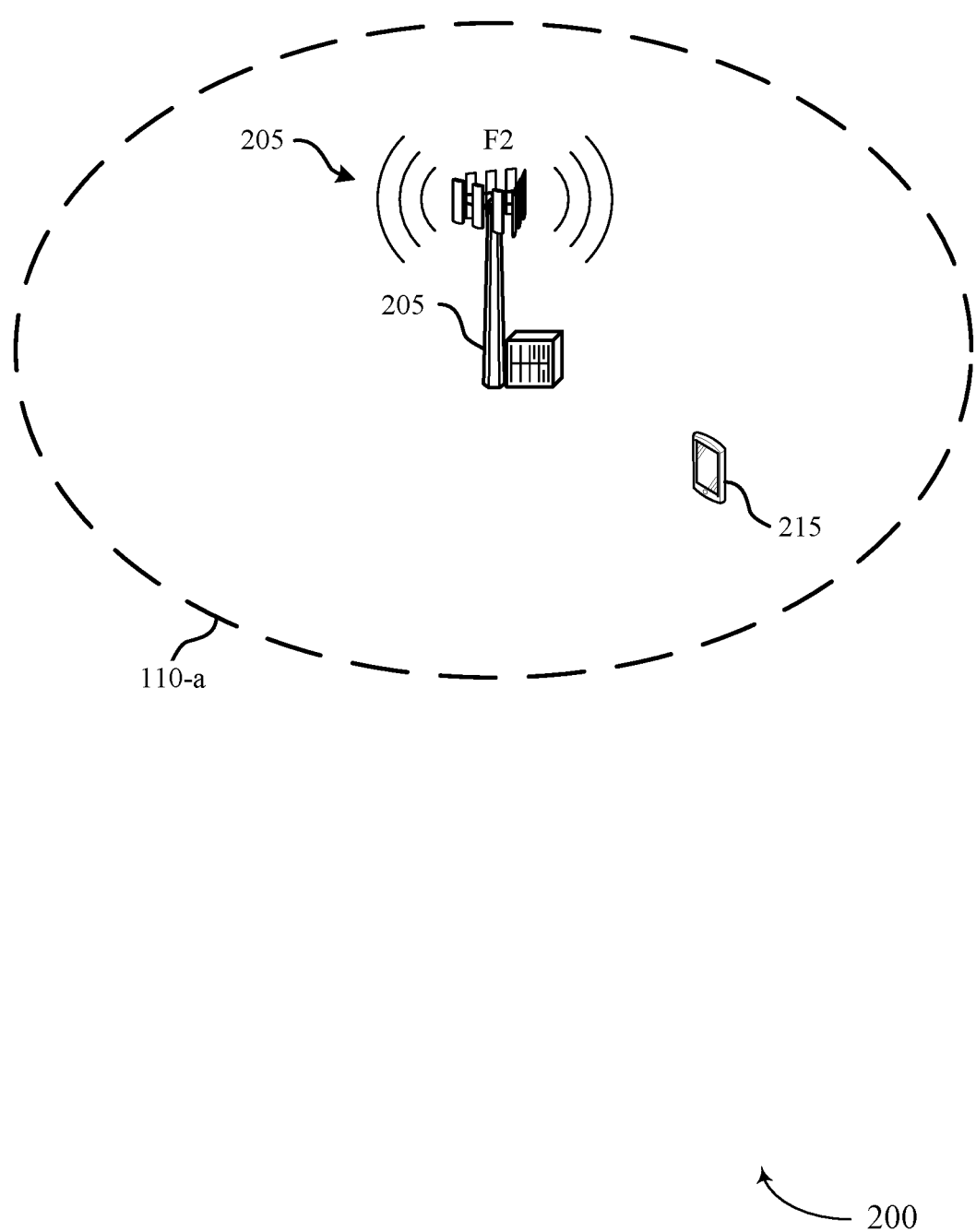
FIG. 2 illustrates an example of a wireless communications system that supports configuration aspects of a tracking reference signal in New Radio in accordance with aspects of the present disclosure.

FIG. 2 illustrates an example of a wireless communications system 200 that supports configuration aspects of a tracking reference signal in New Radio in accordance with various aspects of the present disclosure. In some examples, system 200 may implement aspects of system 100. Base station 205 may serve a geographic coverage area 110-a which may be an example of a geographic coverage area 110 as described with reference to FIG. 1. Some examples of system 200 may be a mmW wireless communications system. System 200 may include a base station 205 and a UE 215, which may be examples of the corresponding devices described with reference to FIG. 1. System 200 may also operate according to a radio access technology (RAT) such as a 5G New Radio RAT.

In an example, base station 205 may select a TRS burst pattern configuration to support time and/or frequency tracking at the UE 215. The TRS burst pattern configuration may include a set of TRS configuration parameters that indicate a pattern of TRS bursts, and which resource elements in one or more resource blocks include TRS tones. A TRS tone may be a transmission on a subcarrier and within a symbol period that has known characteristics (e.g., known amplitude and phase), and the UE 215 may use the known characteristics for frequency and/or time tracking. A TRS burst may be a transmission of a set of TRS tones in one or more transmission time intervals (TTIs) (e.g., a number of symbol periods, slots, subframes, frames, or the like). For example, a TRS burst may be communicated in a resource block that includes a set of resource elements, where each resource element corresponds to a subcarrier and symbol period. A TRS burst may be a transmission of a set of one or more TRS tones in a subset of the set of resource elements of the resource block. The configuration information may specify a TRS burst pattern by indicating in which resource blocks and slots a TRS burst is transmitted, and which resource elements of a resource block include a TRS tone.

To indicate the TRS burst pattern, the base station 205 may select a value for one or more TRS configuration parameters, and may generate configuration information to indicate the selected values for each of the one or more TRS configuration parameters. The base station 205 may transmit the configuration information to the UE 215, and transmit one or more TRS bursts in a pattern as indicated in the configuration information. The UE 215 may receive and process the configuration information, and monitor for a pattern of TRS bursts in accordance with the configuration information.

In some examples, the configuration information may include one or more TRS parameters that indicate aspects of a TRS burst pattern. As further described below, a TRS burst pattern may correspond to a set of slots, and TRS bursts may be transmitted in selected ones of the slots (e.g., within selected slots). The other slots may be used to communicate control and/or data information between the base station 205 and one or more UEs 215. The control and/or data information may also be transmitted within the same slot as a TRS burst, using resource elements not occupied by TRS tones. In some examples, the TRS parameters may be specific to a single burst in a TRS pattern, or apply to multiple bursts in the TRS pattern.

In an example, a TRS burst duration parameter X may indicate a duration of a TRS burst. The duration X may be in terms of a number of TTIs (e.g., a number of symbol periods, slots, subframes, frames, or the like). A TRS burst periodicity parameter Y may indicate a duration of a TRS burst pattern in terms of a number of TTIs. The TRS burst pattern indicated by the configuration information may repeat every Y TTIs.

Some of the TRS parameters may also specify aspects of TRS tones in one or more TRS bursts. A TRS subcarrier spacing parameter $S_f$ may indicate how many resource elements are between each subcarrier (e.g., between each tone) in a particular symbol period of a TRS burst. A TRS symbol spacing parameter $S_t$ may indicate a spacing between TRS symbols within a TTI (e.g., within a slot). A TRS number parameter N may indicate a number of symbols (e.g., OFDM symbols) per TRS burst within a TTI (e.g., within a slot). A TRS bandwidth parameter B may indicate bandwidth in terms of number of resource blocks (RBs) of a TRS burst. A TRS burst may thus be a transmission of a set of one or more TRS tones in selected resource elements of one or more resource blocks, as indicated by the configuration information.

In some examples, the TRS parameters discussed above may be independently configured for any TRS burst or series of TRS bursts. For example, a TRS parameter may be configured or changed despite a value and presence of any other TRS parameter. In some cases, some of the TRS parameters may be configured together. In some examples, only some of the TRS parameters are used, while in other examples, other TRS parameters are used.

Figure 3:
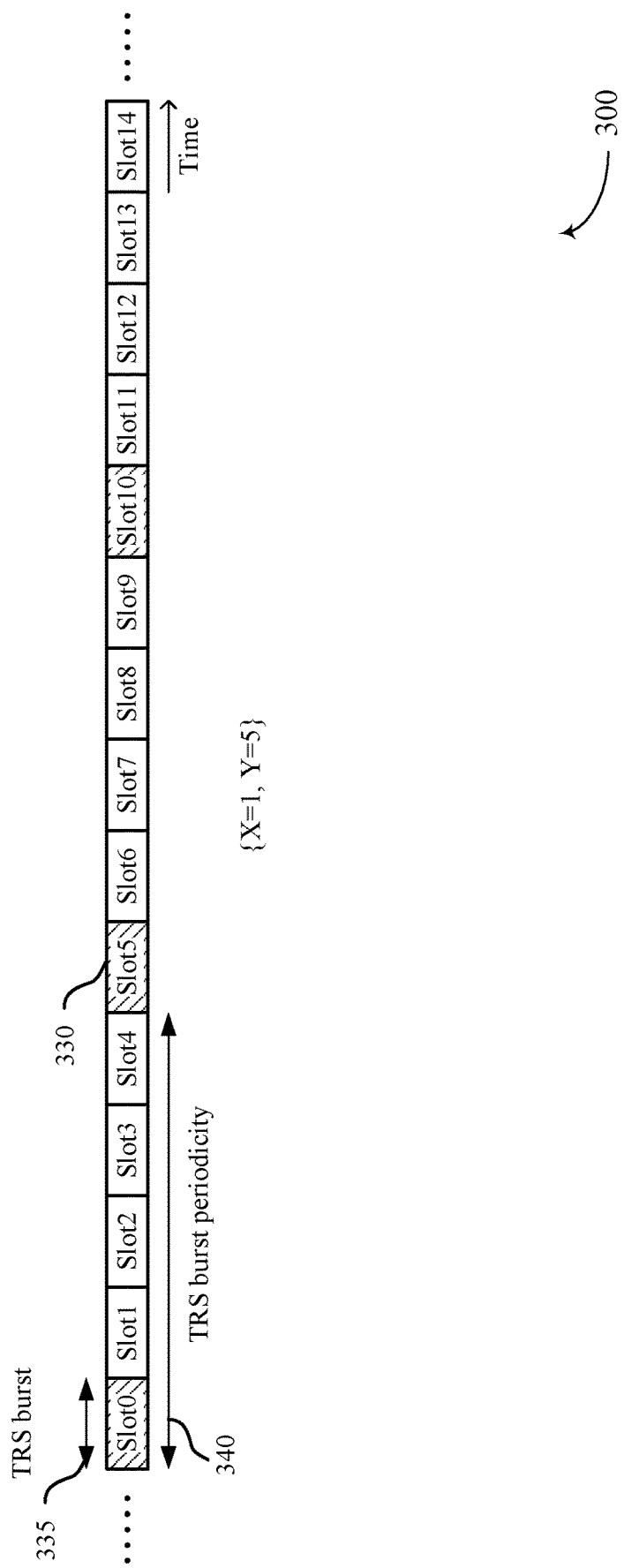
FIGS. 3 through 8 illustrate examples of a TRS burst pattern configuration that supports configuration aspects of a tracking reference signal in New Radio in accordance with aspects of the present disclosure.

FIG. 3 illustrates an example of a TRS burst pattern configuration 300 that supports configuration aspects of a tracking reference signal in New Radio in accordance with various aspects of the present disclosure. In some examples, TRS burst pattern configuration 300 may implement aspects of the wireless communications systems 100 and 200.

Depicted in FIG. 3 is a set of TTIs shown as slots 330, and a TRS burst pattern having a single TRS burst having a duration 335 of a single slot and a TRS burst pattern periodicity 340. In this example, the configuration information may indicate that a TRS duration parameter X is one slot (e.g., X=1), and the periodicity parameter Y is five slots (e.g., Y=5). As depicted, TRS bursts having a duration of a single slot are transmitted in slots 0, 5, 10, and this pattern may repeat every 5 slots until the base station, such as base station 205, changes the configuration information. The base station 205 may transmit to the UE, such as UE 215, configuration information indicating that the base station 205 may transmit a TRS burst having a duration of one slot once every five slots. In some examples, the configuration information may be a bit sequence having a first set of bits to indicate the duration X and a second set of bits to indicate the periodicity parameter Y. The configuration information may indicate one or more of a TRS subcarrier spacing parameter $S_f$, a TRS symbol spacing parameter $S_t$, a TRS number parameter N, a TRS bandwidth parameter B, or the like, or any combination thereof. The UE 215 may receive and process the configuration information, and monitor for TRS bursts in accordance with the configuration information. Other TRS configurations may also be used.

Figure 4:
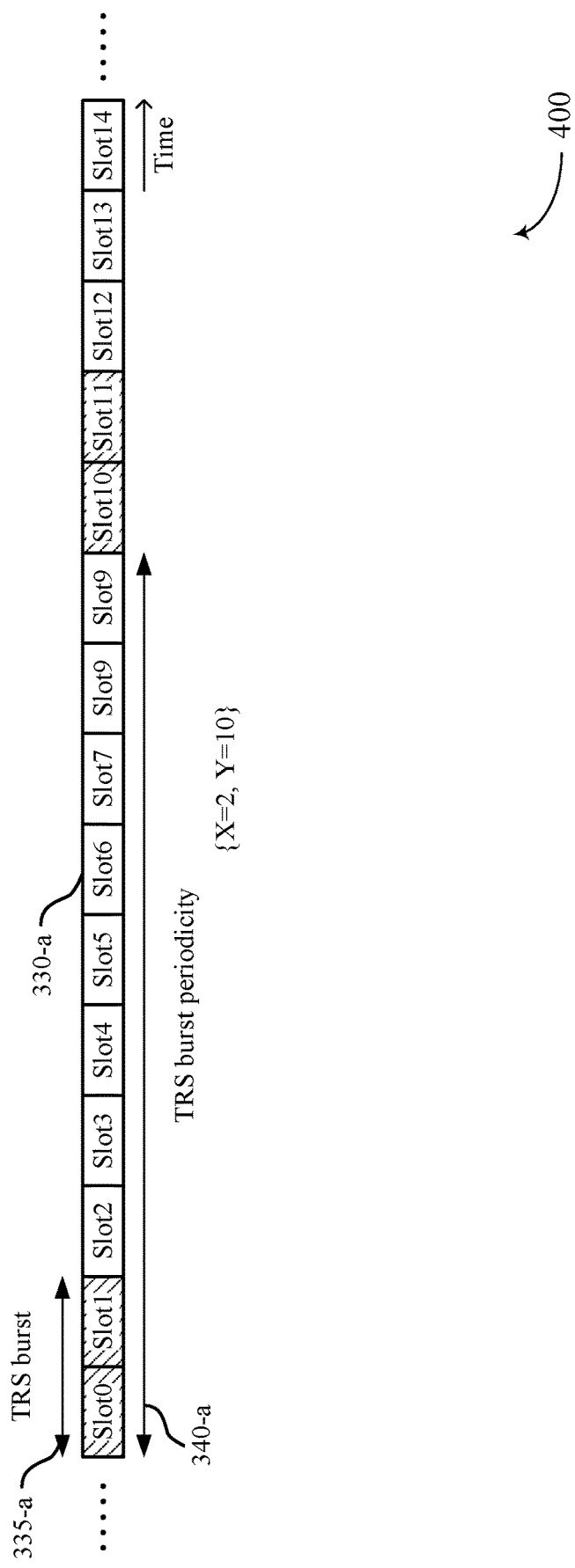

FIG. 4 illustrates an example of a TRS burst pattern configuration 400 that supports configuration aspects of a tracking reference signal in New Radio in accordance with various aspects of the present disclosure. In some examples, TRS burst pattern configuration 400 may implement aspects of the wireless communications systems 100 and 200.

Depicted in FIG. 4 is a set of TTIs shown as slots 330-a, and a TRS burst pattern having a TRS burst with a duration 335-a of a single slot and a periodicity 340-a. In this example, the configuration information may indicate that a TRS duration parameter X is two slots (e.g., X=2), and the TRS burst periodicity parameter Y is ten slots (e.g., Y=10). As depicted, TRS bursts having a duration of two slots are transmitted in slots 0-1, 10-11, and this TRS burst pattern may repeat every 10 slots until the base station 205 changes the configuration information. The base station 205 may transmit to the UE 215 configuration information indicating that the base station 205 may transmit a TRS burst having a duration of two slots once every ten slots. The configuration information may be a bit sequence having a first set of bits to indicate the duration X and a second set of bits to indicate the periodicity parameter Y. The configuration information may also indicate one or more of a TRS subcarrier spacing parameter $S_f$, a TRS symbol spacing parameter $S_t$, a TRS number parameter N, a TRS bandwidth parameter B, or the like, or any combination thereof. The UE 215 may receive and process the configuration information, and monitor for TRS bursts in accordance with the configuration information. Other TRS configurations may also be used.

In some examples, different TRS burst pattern configurations may provide better performance for different use cases. The TRS burst pattern in the example of FIG. 3, where {X=1, Y=5}, may be suitable for time tracking, such as determining a delay, power delay profile (PDP) estimation, or the like, for use in maintaining time synchronization. The TRS burst pattern in the example of FIG. 4, where {X=2, Y=10}, may be suitable for frequency tracking, such as Doppler estimation, or the like, for maintaining frequency synchronization. The suitability for a particular TRS burst pattern configuration for time or frequency tracking may be a function of measurement techniques applied for tracking. For some types of measurements, correlation techniques may be applied to samples of a received signal in the frequency domain, and thus the TRS burst pattern configuration in FIG. 3 may be better suited for time tracking. Other correlation techniques may be applied to samples of a received signal in the time domain, and thus the TRS burst pattern configuration in FIG. 4 may be better suited for frequency tracking.

One solution to support both time and frequency tracking may be to select a larger value for TRS parameter X, and a smaller value for TRS parameter Y. However, TRS overhead increases accordingly with such a solution. For example, a TRS burst pattern configuration where {X=2, Y=5} may be used, but the overhead may, in some instances, be unacceptably high.

Figure 5:
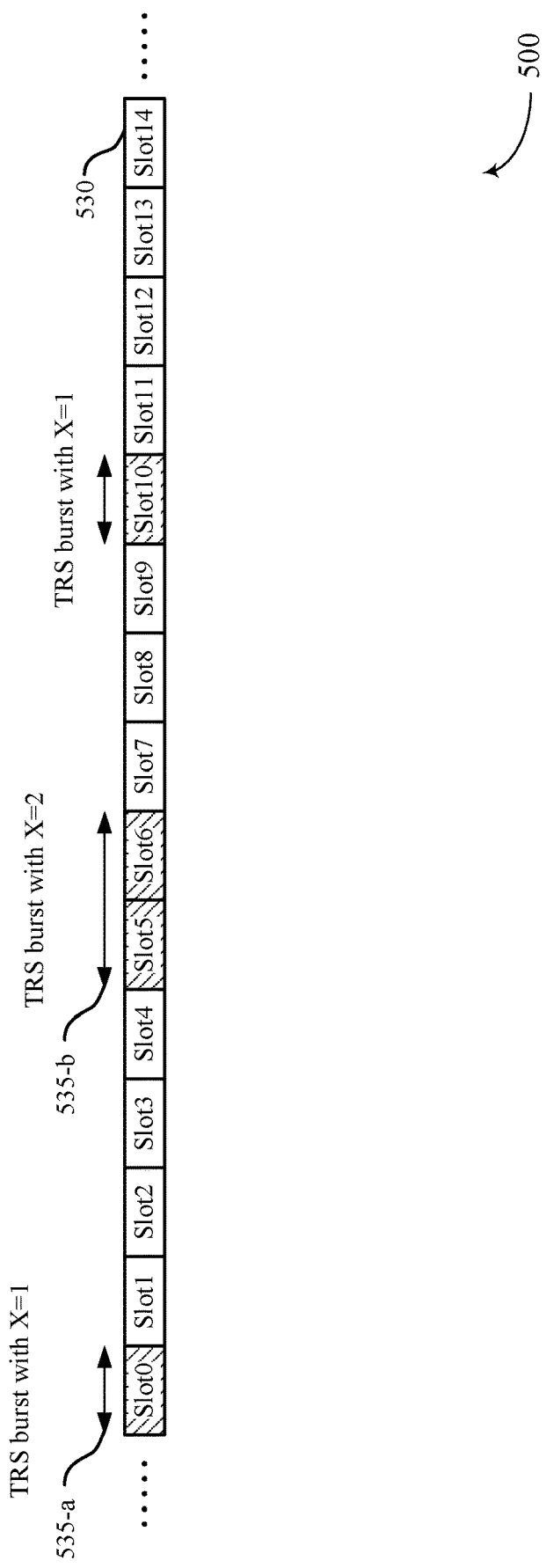

In accordance with the techniques described herein, the configuration information may indicate a TRS burst pattern where up to each TRS burst in the TRS burst pattern has a different duration to support both time and frequency tracking, while also maintaining reasonable TRS overhead. FIG. 5 illustrates an example of a TRS burst pattern configuration 500 that supports configuration aspects of a tracking reference signal in New Radio in accordance with various aspects of the present disclosure. In some examples, TRS burst pattern configuration 500 may implement aspects of the wireless communications systems 100 and 200.

Depicted in FIG. 5 is a set of TTIs shown as slots 530, and a TRS burst pattern configuration 500 that includes TRS bursts 535-a, 535-b that each have a different duration. In this example, the configuration information may include a combination of different parameters for different TRS bursts in the TRS burst pattern. Instead of the configuration information indicating a single value for duration X for all TRS bursts in a TRS burst pattern, the configuration information may specify different values for duration X for up to each TRS burst in a set of TRS bursts. In the depicted example, the configuration information may specify that a first TRS burst has a duration 535-a of one slot (e.g., one TTI) and that a second TRS burst has a duration 535-b of two slots. In other example, the configuration information may specify any desired duration for each TRS burst in a TRS burst pattern.

As depicted, a TRS burst having a duration of one slot is transmitted in slot 0, and a TRS burst having a duration of two slots is transmitted in slots 5-6. This TRS burst pattern may repeat every 10 slots until the base station 205 changes the configuration information. The base station 205 may transmit to the UE 215 configuration information indicating that the base station 205 may transmit a TRS burst having a duration of two slots once every ten slots. The configuration information may be a bit sequence having a first set of bits to indicate the duration X=1 for the first TRS burst, and a second set of bits to indicate the duration X=2 for the second TRS burst. Thus, the duration of a TRS burst may be different for each TRS burst in a TRS burst pattern, and transmissions of TRS bursts may alternate between the different durations in a set of time intervals corresponding to a periodicity of the TRS burst pattern. This example depicted and described may be applied to a TRS burst pattern having a set of TRS bursts including any number of TRS bursts, and the configuration information may indicate different values for duration X for up to each TRS burst in the set of TRS bursts. In some instances, multiple TRS bursts in the set may have the same duration, or each TRS burst may have a different duration.

In some examples, the configuration information may indicate TRS parameters that vary from TRS burst to TRS burst within a TRS burst pattern, and may be unique for up to each TRS burst in the TRS burst pattern. For example, for a first TRS burst in a TRS burst pattern, the configuration information may indicate a first TRS subcarrier spacing parameter $S_f$, a first TRS symbol spacing parameter $S_t$, a first TRS number parameter N, a first TRS bandwidth parameter B, or the like, or any combination thereof. For a second TRS burst in the TRS burst pattern, the configuration information may indicate a second TRS subcarrier spacing parameter $S_f$, a second TRS symbol spacing parameter $S_t$, a second TRS number parameter N, a second TRS bandwidth parameter B, or the like, or any combination thereof. In some instances, multiple TRS bursts in the TRS burst pattern may have the same value for one or more of the TRS parameters.

Figure 6:
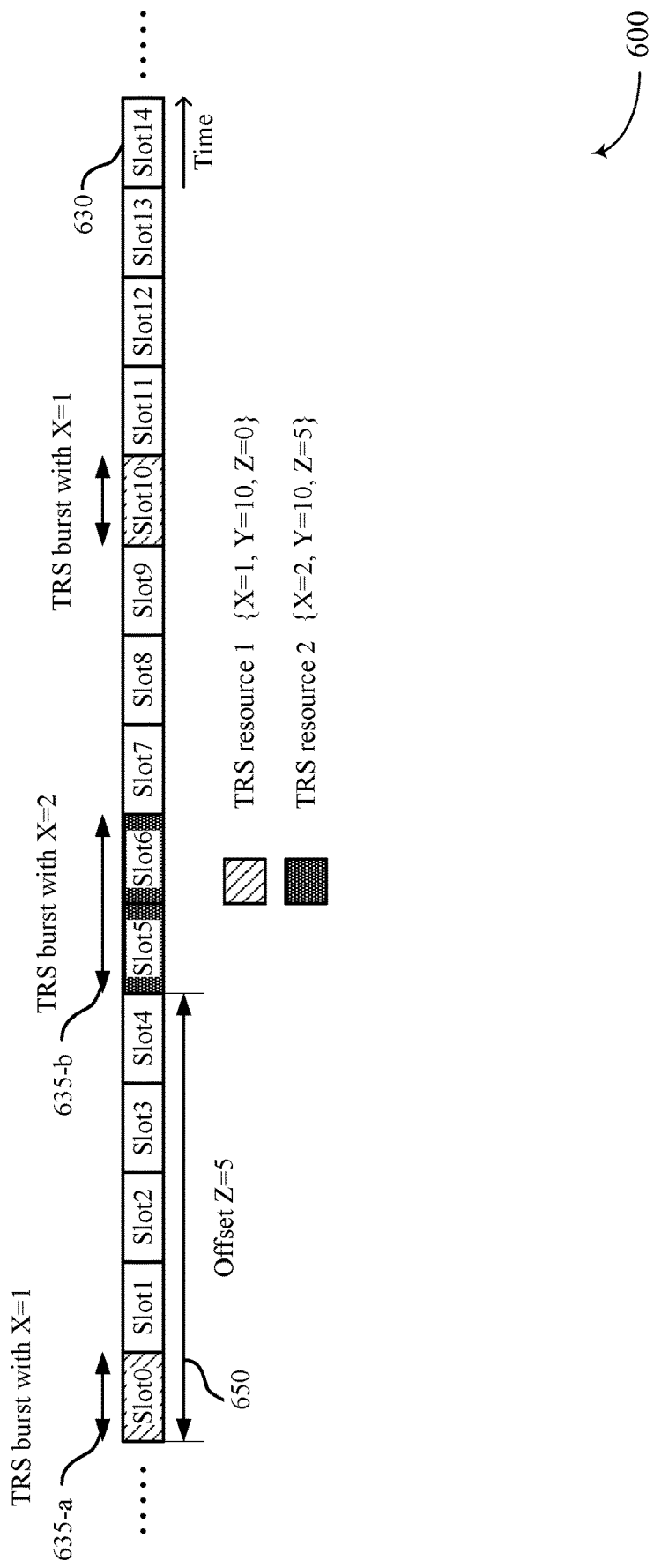

In some examples, multiple different TRS resources may be allocated per base-station-UE pair (e.g., per transmit/receiving point (TRP)-UE pair). FIG. 6 illustrates an example of a TRS burst pattern configuration 600 that supports configuration aspects of a tracking reference signal in New Radio in accordance with various aspects of the present disclosure. In some examples, TRS burst pattern configuration 600 may implement aspects of the wireless communications systems 100 and 200.

In this example, configuration information may be specific to a particular TRS resource, and multiple TRS resources may be allocated to the UE 215. Each TRS resource may define a TRS burst pattern that specifies a value for one or more TRS parameters. The UE 215 may apply a first configuration information corresponding to a first TRS resource, a second configuration information corresponding to a second TRS resource, and so forth. Some or all instances of the configuration information may include an additional configuration parameter Z that specifies an offset (e.g., offset Z 650). The UE 215 may process the offset for determining in which TTI(s) to monitor for the respective TRS resources, and the configuration of a TRS burst pattern to expect within the one or more TTIs.

Depicted in FIG. 6 is a set of TTIs shown as slots 630, and TRS bursts having different durations 635-a, 635-b corresponding to different TRS resources. TRS bursts for a first TRS resource 1 are shown using a first type of shading, and TRS bursts for a second TRS resource 2 are shown using a second type of shading. In the depicted example, first configuration information for the TRS resource 1 may specify that a TRS burst has a duration 635-a of one slot (e.g., X=1), a periodicity of 10 slots (e.g., Y=10), and an offset of zero (e.g., Z=0). Second configuration information for the TRS resource 2 may specify that a TRS burst has a duration 635-a of two slots (e.g., X=2), a periodicity of 10 slots (e.g., Y=10), and an offset of five slots (e.g., Z=5). In this example, a TRS burst for TRS resource 1 occurs at slot 0, and repeats at slot 10 and every 10 slots thereafter until the base station 205 changes the first configuration information. A TRS burst for TRS resource 2 occurs at slots 5-6, and repeats at slots 15-16 and every 10 slots thereafter until the base station 205 changes the second configuration information. It is noted that the techniques described herein may be extended to more than two TRS resources.

In some instances, multiple TRS resources may collide. A collision may refer to an instance when multiple TRS resources are scheduled in at least one overlapping TTI (e.g., in a same slot). In such a situation, a priority among TRS resources may be determined. In an example, the configuration information may explicitly specify a priority order among the different TRS resources, and when the UE 215 determines there is a collision, monitors for a TRS burst corresponding to configuration information of a TRS resource having the highest priority in the priority order of the TRS resources that collide. For example, if there are three TRS resources, with TRS resource 1 having a highest priority, TRS resource 2 having a next highest priority, and TRS resource 3 having a lowest priority, the UE 215 applies the configuration information for TRS resource 1 when there is a collision with any other TRS resource, and the configuration information for TRS resource 2 when there is a collision with TRS resource 3. The base station 205 may similarly determine a priority order of which TRS resource to use for transmitting a TRS burst when multiple TRS bursts collide. The base station 205 or the UE 215 may assign a priority order to the bursts. In one example, a burst with a longer duration may be given a higher priority. In another example, a burst with a shorter duration may be given a higher priority. Other examples assign priority to the bursts based on other characteristics as described herein.

In other examples, UE 215 may apply one or more rules for implicitly determining a priority order among TRS resources. For example, the priority order may be based on values of a TRS parameter. The UE 215 may determine values for a TRS parameter for each TRS resource, and determine a priority order based on the determined values.

For example, if TRS resources collide that respectively have durations X=1 and X=2, the TRS resource with X=2 may be determined to have a higher priority by due to a rule indicating that a TRS parameter having a larger value has priority. In other examples, a TRS parameter having a smaller value may be determined to have a higher priority. If there is a tie, a value for a different TRS parameter may be similarly used for determining relative priority among TRS resources. The base station 205 may determine what TRS resource to use based on the priority order when transmitting a TRS burst, and the UE 215 may determine what TRS resource to expect based on the priority order when receiving a TRS burst.

In some examples, a single TRS resource may be defined, and the configuration information may indicate a sequence of values for a TRS parameter in a TRS burst pattern, instead of defining a single value for the TRS parameter. In an example, the configuration information may define a sequence of values for each TRS parameter, and TRS bursts may be communicated in a TRS burst pattern in accordance with the sequence. For example, a TRS burst pattern shown in FIG. 6 may be defined by indicating the following sequence of values in the configuration information: duration X={1, 2}, time interval Y={5, 5}. Thus, in the first 5 time slots, the duration of the TRS burst is 1 slot, and in the second 5 time slots, the duration of the TRS burst is 2 slots. The TRS burst pattern may then repeat.

In some examples, the configuration information may indicate a sequence of values for TRS parameters of any desired duration to define any type of TRS burst pattern. For example, a more complicated sequence for a TRS burst pattern may be defined (e.g., X={1, 2, 1, 1, 2}, Y={5,5,10, 10,5}). The TRS burst pattern may repeat, in accordance with the indicated sequence of values for each TRS parameter, until the base station 205 changes the configuration information. In some examples, a maximum duration sequence of values for one or more TRS parameters may be defined. Thus, each burst duration X may be associated with a corresponding time interval duration Y, and the base station 205 may transmit, and the UE 215 may receive, TRS bursts having the respective durations in respective time intervals of duration Y.

Figure 7:
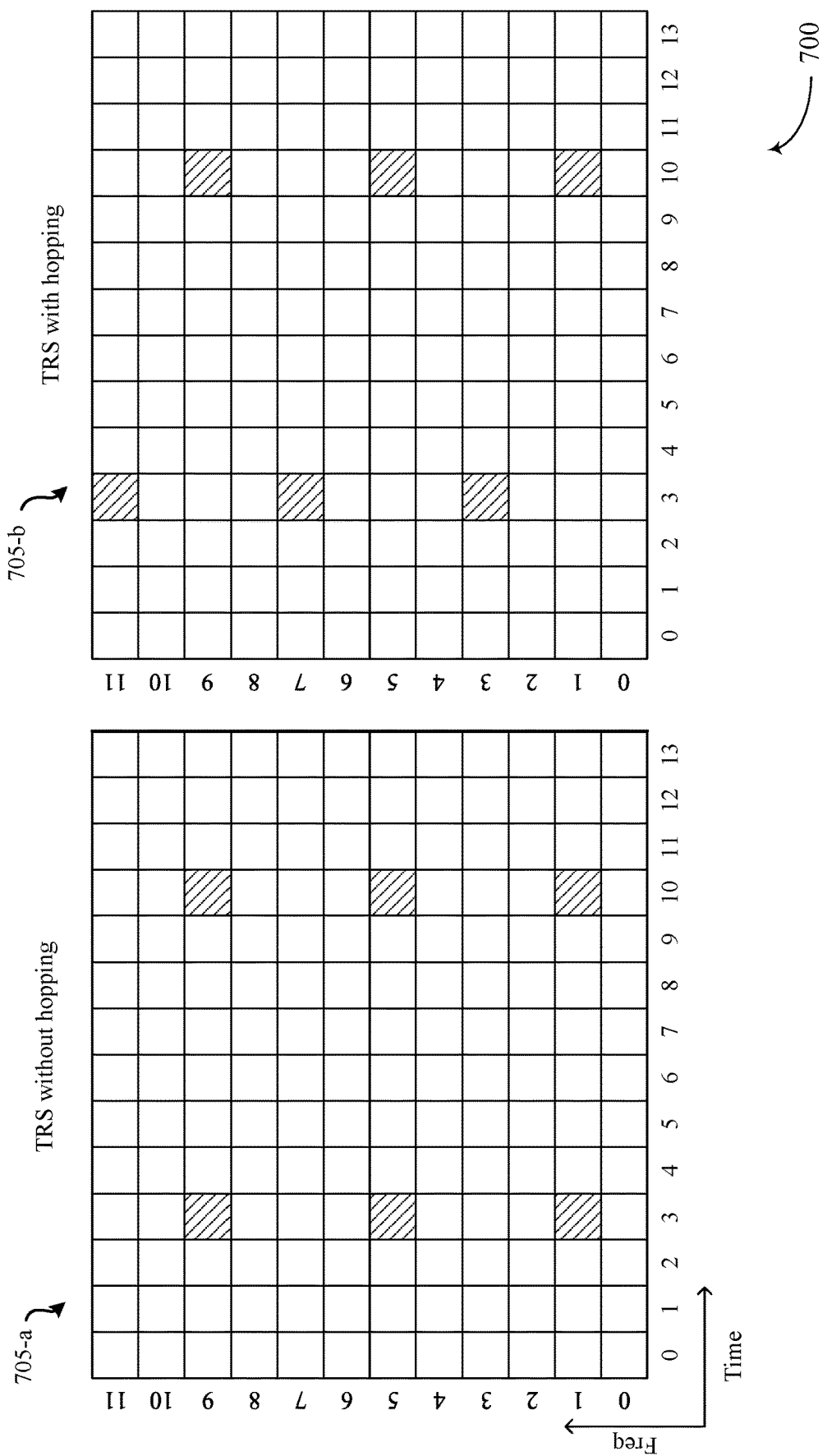

The techniques described herein may also support frequency hopping. FIG. 7 illustrates an example of a TRS burst pattern configuration 700 that supports configuration aspects of a tracking reference signal in New Radio in accordance with various aspects of the present disclosure. In some examples, TRS burst pattern configuration 700 may implement aspects of wireless communications systems 100 and 200. In TRS hopping, a frequency of one or more tones of a TRS transmission may change over time, and the configuration information may include a TRS parameter indicating a hopping pattern. In one example, the hopping pattern may be a tone hopping pattern. In an example, the configuration information may include a TRS frequency shift parameter $O_f$, alone or in combination with any of the TRS parameters described herein. Along with the TRS tone spacing parameter $S_f$, the configuration information may indicate a TRS tone location within a TRS band within a particular TRS symbol. The TRS frequency shift parameter $O_f$ may be defined as a sequence of values that defines a frequency hopping pattern of TRS tones within one or more transmission time intervals (e.g., within a single slot).

Depicted in FIG. 7 are resource grids 705-*a*, 705-*b* that show frequency on the y-axis and time on the x-axis. Each box in the resource grids 705 may represent a resource element that corresponds to a single subcarrier (e.g., tone) and a single TTI (e.g., a symbol period, an OFDM symbol period, etc.). A bandwidth for communicating a TRS burst may correspond to a particular TRS frequency band that may include one or more resource blocks. In this example, the TRS frequency band for each of the resource grids 705 may correspond to a single resource block that includes 12 subcarriers (e.g., subcarriers 0 to 11). A slot may be defined to include 14 symbol periods, and the resource grids 705 may depict one slot (e.g., symbol periods 0-13).

The TRS frequency shift parameter $O_f$ may define an offset relative to a reference frequency (e.g., offset relative to a subcarrier of a particular reference element). The reference frequency may be a frequency of a subcarrier within a resource grid 705 (e.g., subcarrier 11). In the depicted example for resource grid 705-*a*, the configuration information may indicate that the TRS frequency shift parameter $O_f$ has a value of 1 (e.g., O=1), the TRS tone spacing parameter $S_f$ has a value of 4 (e.g., $S_f$=4), and the TRS symbol spacing parameter $S_t$ has a value of 7 (e.g., $S_t$=7). In some cases, the TRS symbol spacing parameter $S_t$ may indicate the distance between two TRS symbols in a same slot, and a location of a starting symbol index may be specified or may be indicated in the configuration information. In some cases, the configuration information may specify an offset value for each symbol index of a set of symbol indexes. In the depicted example in resource grid 705-*a*, the starting symbol index may indicate symbol 3. Thus, the configuration information may indicate that a TRS tone is communicated at subcarrier 1 in symbol period 3 within the resource grid 705-*a*, and additional TRS tones are communicated in symbol period 3 that are spaced apart by 4 subcarriers within the resource grid 705-*a*. Thus, TRS tones are also located at the resource elements in symbol period 3 at subcarriers 5 and 9. In this example, TRS symbol spacing parameter $S_t$ has a value of 7, and thus TRS tones are communicated in subcarriers 1, 5, and 9 of symbol period 10.

In some examples, the configuration information may indicate, for a TRS burst pattern, a sequence of values for the TRS frequency shift parameter $O_f$ to support frequency hopping of TRS tones. In resource grid 705-*b*, the TRS frequency shift parameter $O_f$ may be different for different slots or different TRS symbol indexes within a slot. In the depicted example, the TRS frequency shift parameter $O_f$ may have a value of 3 in a first TRS symbol period (e.g., at symbol index 3) of a slot and a value of 1 in a second TRS symbol period of the same slot. Thus, TRS tones are communicated in subcarriers 3, 6, and 11 of symbol period 3 of a slot in grid 705-*b*, and TRS tones are communicated in subcarriers 1, 5, and 9 of symbol period 10 of the slot of grid 705-*b*. Beneficially, multiple TRS tones having different frequency offsets (e.g., different frequency shift) may be communicated in a same slot to attain an increased pull-in range in delay spread estimation, PDP estimation, or the like. Resource grid 705-*b* with subcarrier spacing of $S_f$=4 and using frequency hopping of two resource elements may provide the same estimation range as subcarrier space of $S_f$=2. Thus, the same estimation range may be obtained while using half as many TRS tones, thereby significantly reducing TRS tone overhead but maintaining comparable performance.

Figure 8:
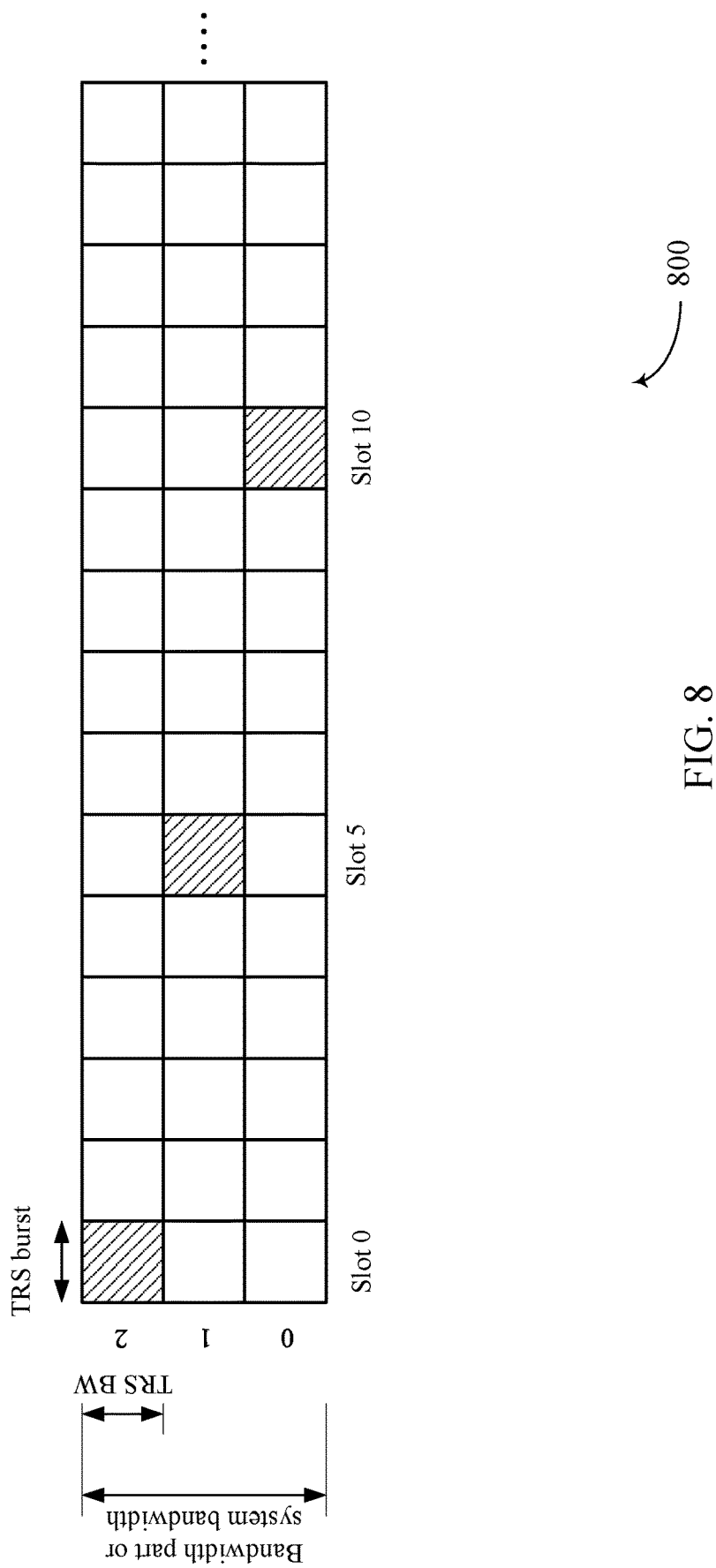

Some of the benefits of frequency hopping may also be obtained on a larger bandwidth scale. FIG. 8 illustrates an example of a TRS burst pattern configuration 800 that supports configuration aspects of a tracking reference signal in New Radio in accordance with various aspects of the present disclosure. In some examples, TRS burst pattern configuration 800 may implement aspects of wireless communications systems 100 and 200. TRS sub-band hopping may be applied where a small bandwidth TRS resource can be configured with sub-band hopping to cover a wider bandwidth. For example, the bandwidth of a TRS resource may be defined to include a set of some or more resource blocks that constitute a fraction of a bandwidth part or an entire bandwidth part. A system bandwidth may include a set of distinct bandwidth parts.

The configuration information may include a configuration parameter indicating an frequency offset and/or hopping pattern being be used. For example, a bandwidth part may be divided into a set of available TRS bandwidths, and the configuration information may specify a hopping pattern for a TRS burst. The TRS burst may hop from available TRS bandwidth to bandwidth according to the hopping pattern. The configuration information may identify one or more slots and one or more available bandwidths for a TRS transmission. The TRS transmission may include one or more TRS bursts. In the depicted example, three available TRS bandwidths may be defined (e.g., TRS BW 0, 1, and 2). The configuration information may specify that, a TRS transmission is communicated in TRS BW 2 at slot 0, TRS BW 1 at slot 5, and TRS BW 0 at slot 10. The hopping pattern for TRS transmission may repeat every 15 slots until the base station changes the configuration information. The configuration information may define other hopping patterns. In another example, a system bandwidth may be divided into a set of available bandwidth parts, and the configuration information may specify a hopping pattern for a TRS burst. The TRS burst may hop from bandwidth part to bandwidth part according to the hopping pattern. The TRS parameters described herein may also vary from slot to slot.

Figure 9:
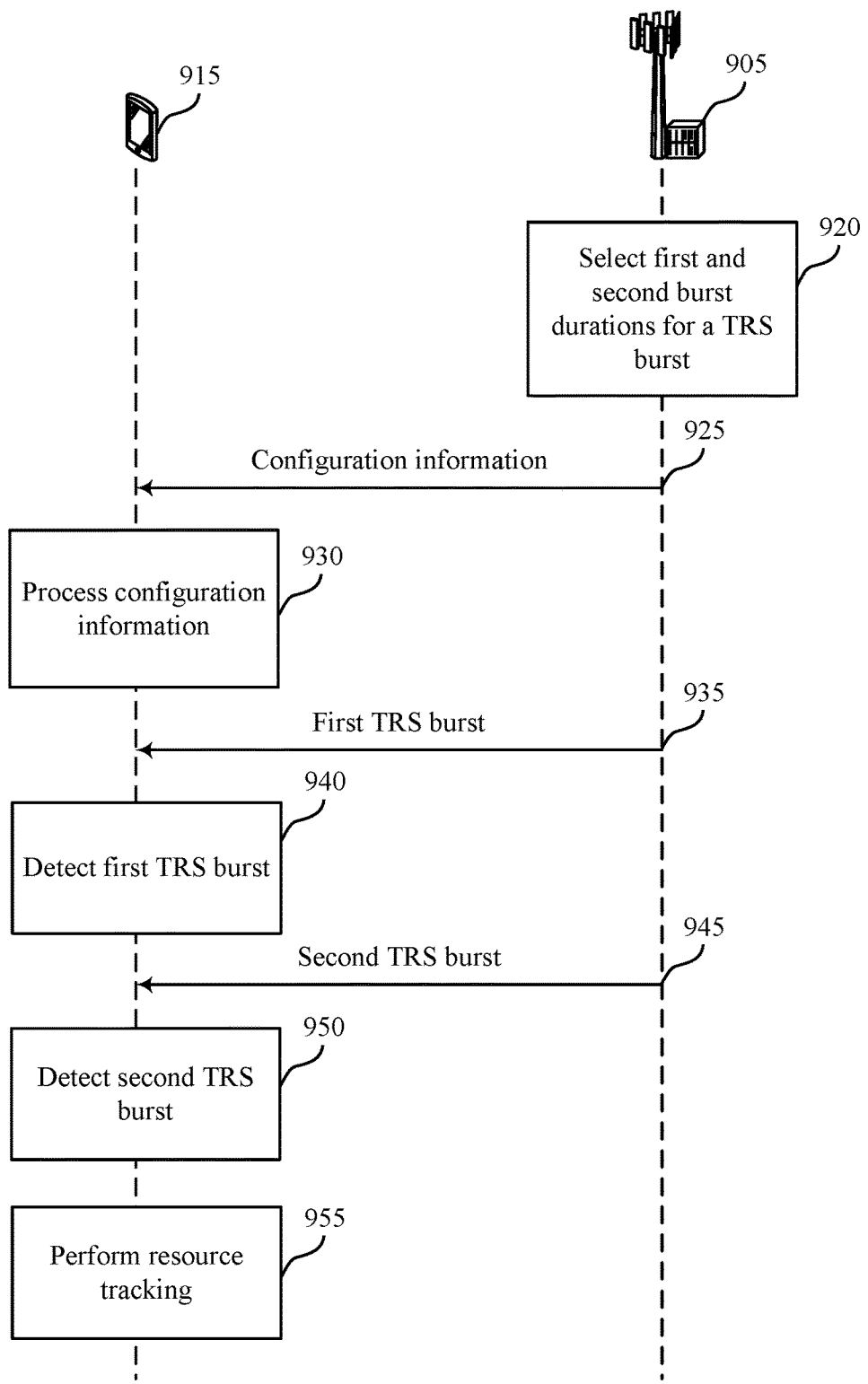
FIGS. 9 and 10 illustrate examples of a process flow that supports configuration aspects of a tracking reference signal in New Radio in accordance with aspects of the present disclosure.

FIG. 9 illustrates an example of a process flow 900 that supports configuration aspects of a tracking reference signal in New Radio in accordance with various aspects of the present disclosure. In some examples, process flow 900 may implement aspects of wireless communications systems 100 and 200. Base station 905 is an example of base stations 105, 205, and UE 915 is an example of UEs 115, 215.

At 920, a base station 905 may select a set of burst durations for a TRS burst that includes a first burst duration and a second burst duration, where the first burst duration is different from the second burst duration. In other examples, three or more burst durations may be chosen.

At 925, the base station 905 may transmit configuration information indicating the set of burst durations, including the first burst duration and the second burst duration, to a UE 915. In some cases, the base station 905 may allocate a set of TRS resources, including a first TRS resource and a second TRS resource, to the UE 915, wherein the configuration information indicates that each of the set of resources have been allocated to the UE 915. In some cases, the base station 905 may determine a time offset between the first resource and the second resource, wherein the configuration information indicates the time offset. In some cases, the base station 905 may determine a priority order of the first resource relative to the second resource, wherein the configuration information indicates the priority order At 930, the UE 915 may receive and process the configuration information. In some examples, the UE 915 may determine, from the configuration information, that the first burst duration corresponds to a first time interval and the second burst duration corresponds to a second time interval, the second time interval occurring after the first time interval. In some examples, the UE 915 may determine, from the configuration information, that transmissions of TRS bursts are scheduled to alternate between the first burst duration and the second burst duration in each time interval of a set of time intervals. In some cases, the UE 915 may determine, from the configuration information, that the first burst duration corresponds to the first resource and the second burst duration corresponds to the second resource.

At 935, the base station 905 may transmit a first TRS burst having the first burst duration in accordance with the configuration information. At 940, the UE 915 may monitor for and detect the first TRS burst having the first burst duration in accordance with the configuration information.

At 945, the base station 905 may transmit a second TRS burst having the second burst duration in accordance with the configuration information. In some cases, the base station 905 may alternate between transmitting the first TRS burst and the second TRS burst in each time interval of a set of time intervals. At 950, the UE 915 may monitor for and detect the second TRS burst having the second burst duration in accordance with the configuration information.

At 955, the UE 915 may perform resource tracking based at least in part on the detected first TRS burst and the second TRS burst. The resource tracking may be time tracking for maintain time synchronization, frequency tracking for maintaining frequency synchronization, or the like. The UE 915 may also process received TRS tones for one or more of Doppler spread estimation, power delay profile (PDP) estimation, delay estimation, or the like.

Figure 10:
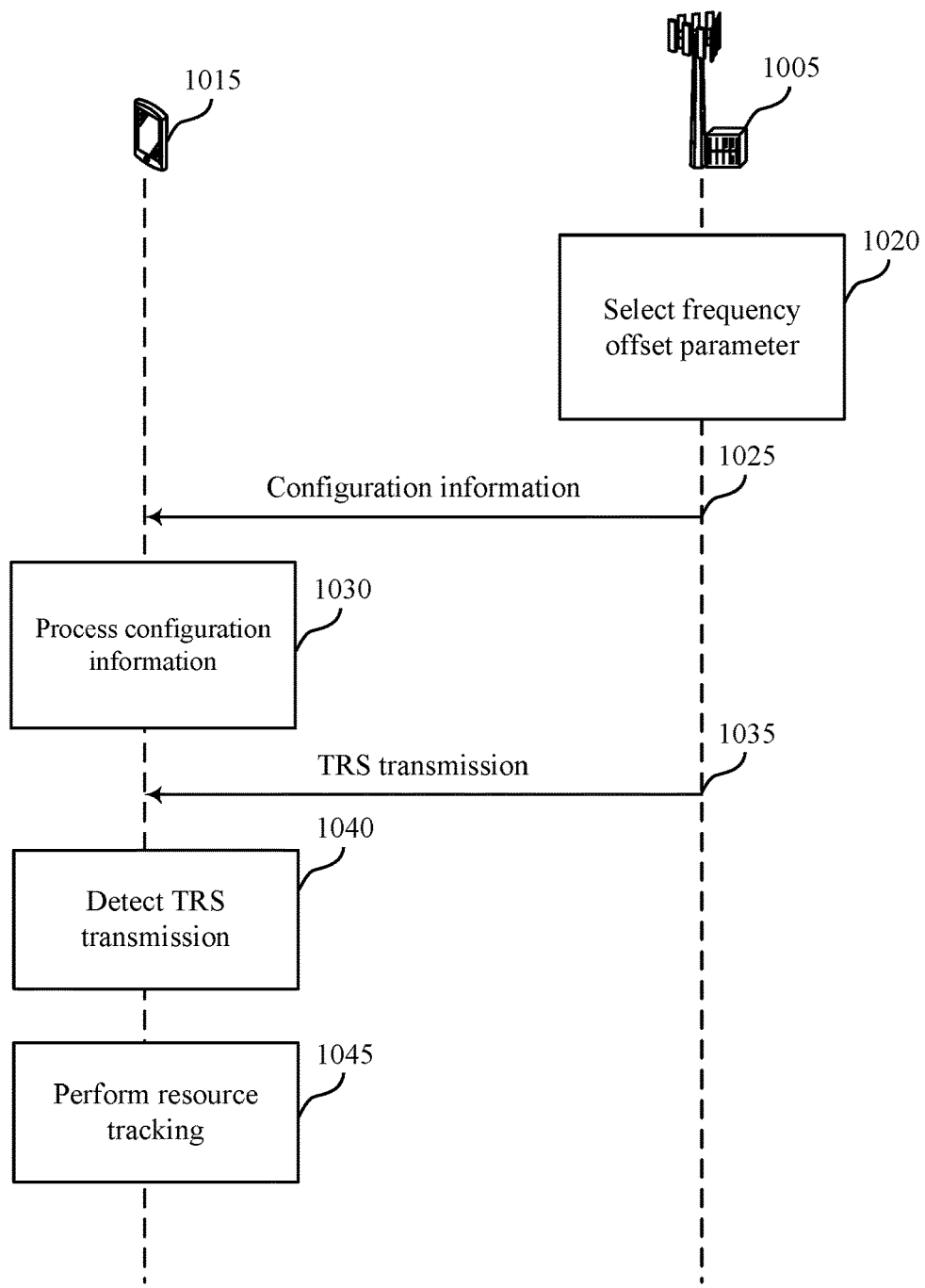

FIG. 10 illustrates an example of a process flow 1000 that supports configuration aspects of a tracking reference signal in New Radio in accordance with various aspects of the present disclosure. In some examples, process flow 1000 may implement aspects of wireless communications systems 100 and 200. A base station 1005 is an example of base stations 105, 205, 905, and UE 1015 is an example of UEs 115, 215, 1015.

At 1020, the base station 1005 may select a frequency offset parameter. The frequency offset parameter may indicate an offset relative to a reference frequency (e.g., subcarrier of a particular reference element), and may be expressed in terms of a number of resource elements, a frequency band, a frequency bandwidth part, or the like. In some cases, the base station 1005 may determine a first offset value (e.g., offset value for a first symbol period of a slot) and a second offset value (e.g., offset value for a second, different symbol period of a slot), wherein the frequency offset parameter indicates the first offset value and the second offset value. In some cases, the offset may be indicated for a set of symbol indexes within a particular transmission time interval (e.g., within a slot), and the frequency offset parameter may specify an offset value for each symbol index in the set of symbol indexes.

At 1025, the base station 1005 may transmit configuration information to a UE 1015 indicating the frequency offset parameter, and the UE 1015 may receive the configuration information. In some cases, the base station 1005 may determine tone spacing for the TRS transmission, and the configuration information may indicate the tone spacing.

At 1030, the UE 1015 may receive and process the configuration information. At 1035, the base station 1005 may transmit a TRS transmission having a frequency offset corresponding to the frequency offset parameter. At 1040, the UE 1015 may monitor for and detect the TRS transmission within a frequency band based at least in part on the frequency offset parameter. At 1045, the UE 1015 may perform resource tracking based at least in part on the detected TRS transmission.

Beneficially, the techniques described herein provide for TRS burst pattern configurations that permit a UE to perform resource tracking while managing TRS overhead.

Figure 11:
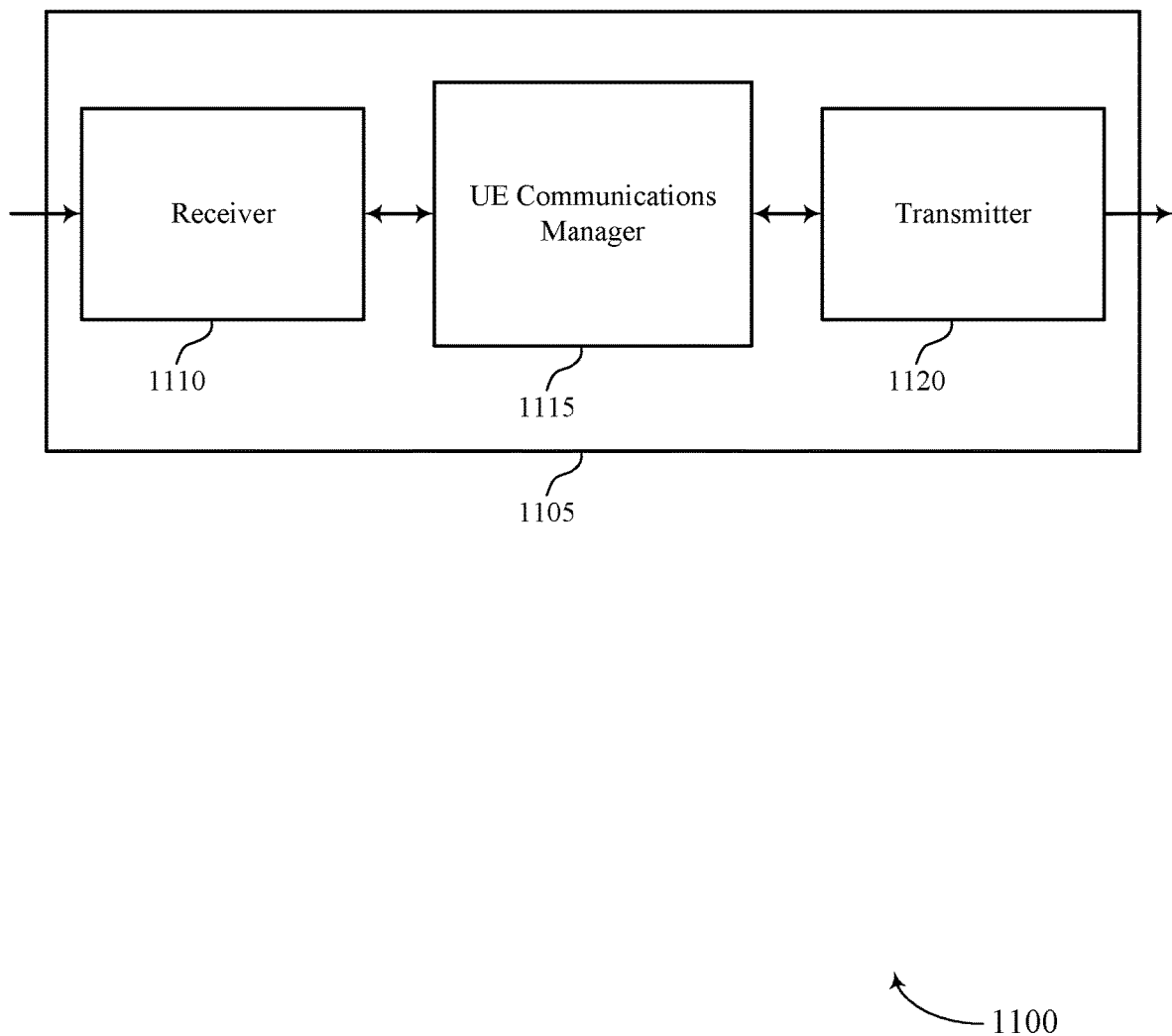
FIGS. 11 through 13 show block diagrams of a device that supports configuration aspects of a tracking reference signal in New Radio in accordance with aspects of the present disclosure.

FIG. 11 shows a block diagram 1100 of a wireless device 1105 that supports configuration aspects of a tracking reference signal in New Radio in accordance with aspects of the present disclosure. Wireless device 1105 may be an example of aspects of a user equipment (UE) 115 as described herein. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to configuration aspects of a tracking reference signal in New Radio, etc.). Information may be passed on to other components of the device. The receiver 1110 may be an example of aspects of the transceiver 1435 described with reference to FIG. 14. The receiver 1110 may utilize a single antenna or a set of antennas.

UE communications manager 1115 may be an example of aspects of the UE communications manager 1415 described with reference to FIG. 14.

UE communications manager 1115 and/or at least some of its various sub-components may be implemented in hardware, software executed by a processor, firmware, or any combination thereof. If implemented in software executed by a processor, the functions of the UE communications manager 1115 and/or at least some of its various sub-components may be executed by a general-purpose processor, a digital signal processor (DSP), an application-specific integrated circuit (ASIC), an field-programmable gate array (FPGA) or other programmable logic device (PLD), discrete gate or transistor logic, discrete hardware components, or any combination thereof designed to perform the functions described in the present disclosure. The UE communications manager 1115 and/or at least some of its various sub-components may be physically located at various positions, including being distributed such that portions of functions are implemented at different physical locations by one or more physical devices. In some examples, UE communications manager 1115 and/or at least some of its various sub-components may be a separate and distinct component in accordance with various aspects of the present disclosure. In other examples, UE communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1115 may receive configuration information indicating a first burst duration and a second burst duration for a TRS burst, the first burst duration being different from the second burst duration, detect a first TRS burst having the first burst duration and a second TRS burst having the second burst duration based on the configuration information, and perform resource tracking based on the detected first TRS burst and the second TRS burst. The UE communications manager 1115 may also receive configuration information indicating a frequency offset parameter, detect a TRS transmission within a frequency band based on the frequency offset parameter, and perform resource tracking based on the detected TRS transmission.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
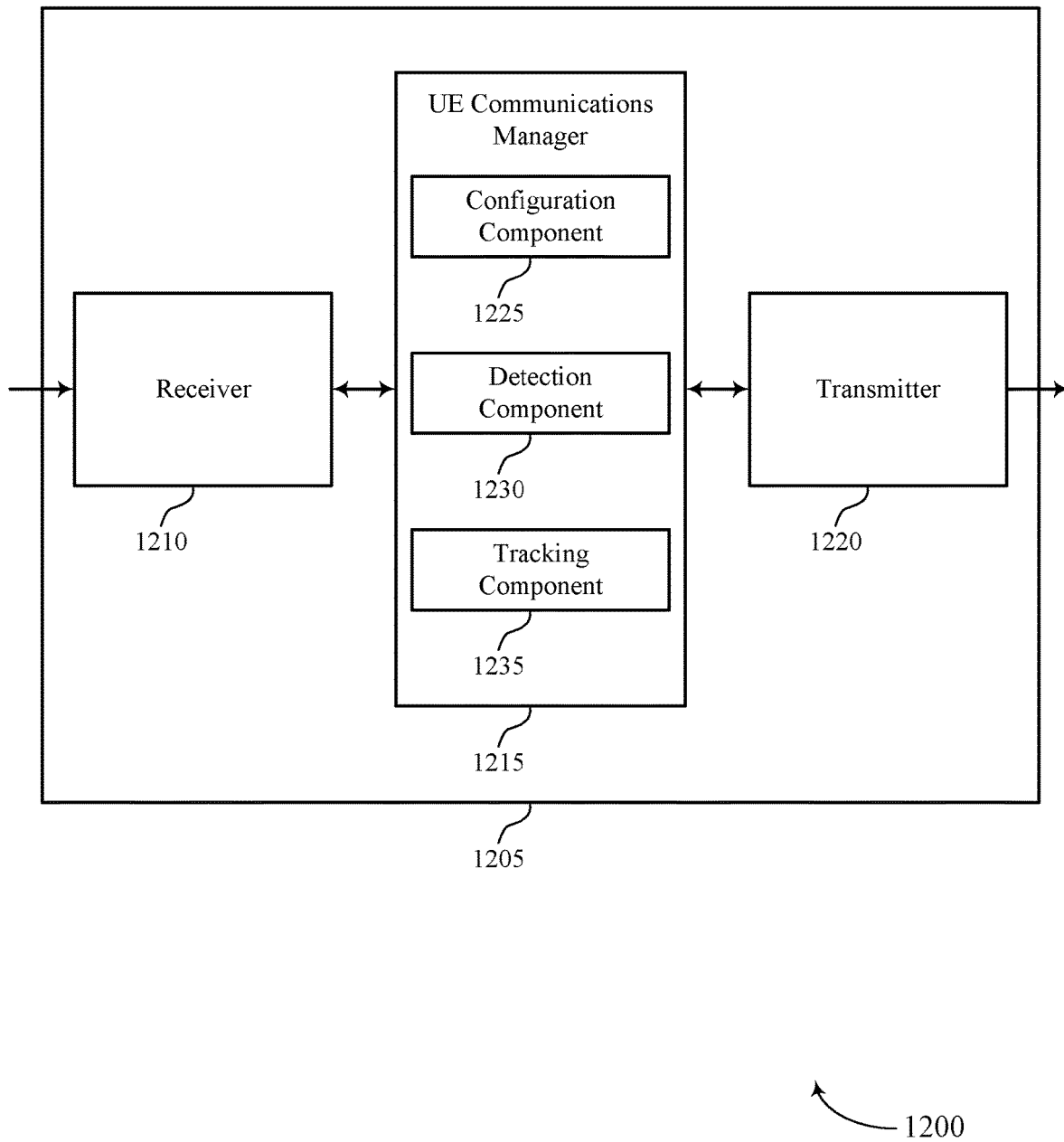

FIG. 12 shows a block diagram 1200 of a wireless device 1205 that supports configuration aspects of a tracking reference signal in New Radio in accordance with aspects of the present disclosure. Wireless device 1205 may be an example of aspects of a wireless device 1105 or a UE 115 as described with reference to FIG. 11. Wireless device 1205 may include receiver 1210, UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to configuration aspects of a tracking reference signal in New Radio, etc.). Information may be passed on to other components of the device. The receiver 1210 may be an example of aspects of the transceiver 1435 described with reference to FIG. 14. The receiver 1210 may utilize a single antenna or a set of antennas.

UE communications manager 1215 may be an example of aspects of the UE communications manager 1415 described with reference to FIG. 14. UE communications manager 1215 may also include configuration component 1225, detection component 1230, and tracking component 1235.

Configuration component 1225 may receive configuration information indicating a first burst duration and a second burst duration for a TRS burst, the first burst duration being different from the second burst duration, and may determine, from the configuration information, a first burst duration and a second burst duration for the TRS transmission. Configuration component 1225 may determine, from the configuration information, that transmissions of TRS bursts are scheduled to alternate between the first burst duration and the second burst duration in each time interval of a set of time intervals, and may determine, from the configuration information, a set of burst durations and a corresponding time interval duration for each of the set of burst durations, the set of burst durations including the first and second burst durations.

Configuration component 1225 may determine, from the configuration information, one or both of a frequency offset parameter and tone spacing. In some cases, monitoring for the first TRS burst is based on the tone spacing. Configuration component 1225 may determine, from the configuration information, that the first burst duration corresponds to a first time interval and the second burst duration corresponds to a second time interval, the second time interval occurring after the first time interval, and may process the frequency offset parameter and the tone spacing to determine a location of at least one TRS tone of the TRS transmission within the frequency band relative to a reference frequency.

Configuration component 1225 may process the frequency offset parameter to determine a first offset value corresponding to a first TTI and a second offset value corresponding to a second TTI, and receive configuration information indicating a frequency offset parameter. Configuration component 1225 may determine, from the frequency offset parameter, an offset value for a plurality of symbol indexes. Configuration component 1225 may monitor, at a plurality of respective symbol periods corresponding to the plurality of symbol indexes, for a TRS tone of the TRS transmission.

In some cases, determining, from the configuration information, a periodicity of a time interval and a time offset. The frequency offset parameter may indicate an offset in a number of resource elements. In some cases, the frequency offset parameter indicates a bandwidth part of a set of different bandwidth parts within a system bandwidth.

Detection component 1230 may detect a first TRS burst having the first burst duration and a second TRS burst having the second burst duration based on the configuration information, and may monitor, within each instance of the time interval, for a TRS burst having the first burst duration at a first location and for a TRS burst having the second burst duration at a second location corresponding to the offset. Detection component 1230 may monitor for one of the first TRS burst or the second TRS burst within the TTI based on the priority order, and may monitor for a set of TRS bursts based on the set of burst durations and the corresponding time interval durations, the set of TRS bursts including the first and second TRS bursts. Detection component 1230 may monitor for the first TRS burst based on the frequency offset parameter, and may monitor for a TRS tone of the TRS transmission within the first TTI corresponding to the first offset value and for a TRS tone of the TRS transmission within the second TTI corresponding to the second offset value. Detection component 1230 may detect a TRS transmission within a frequency band based on the frequency offset parameter, and may monitor for the TRS transmission having the first burst duration and a second TRS transmission having the second burst duration based on the configuration information.

Tracking component 1235 may perform resource tracking based on the detected first TRS burst and the second TRS burst and perform resource tracking based on the detected TRS transmission.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
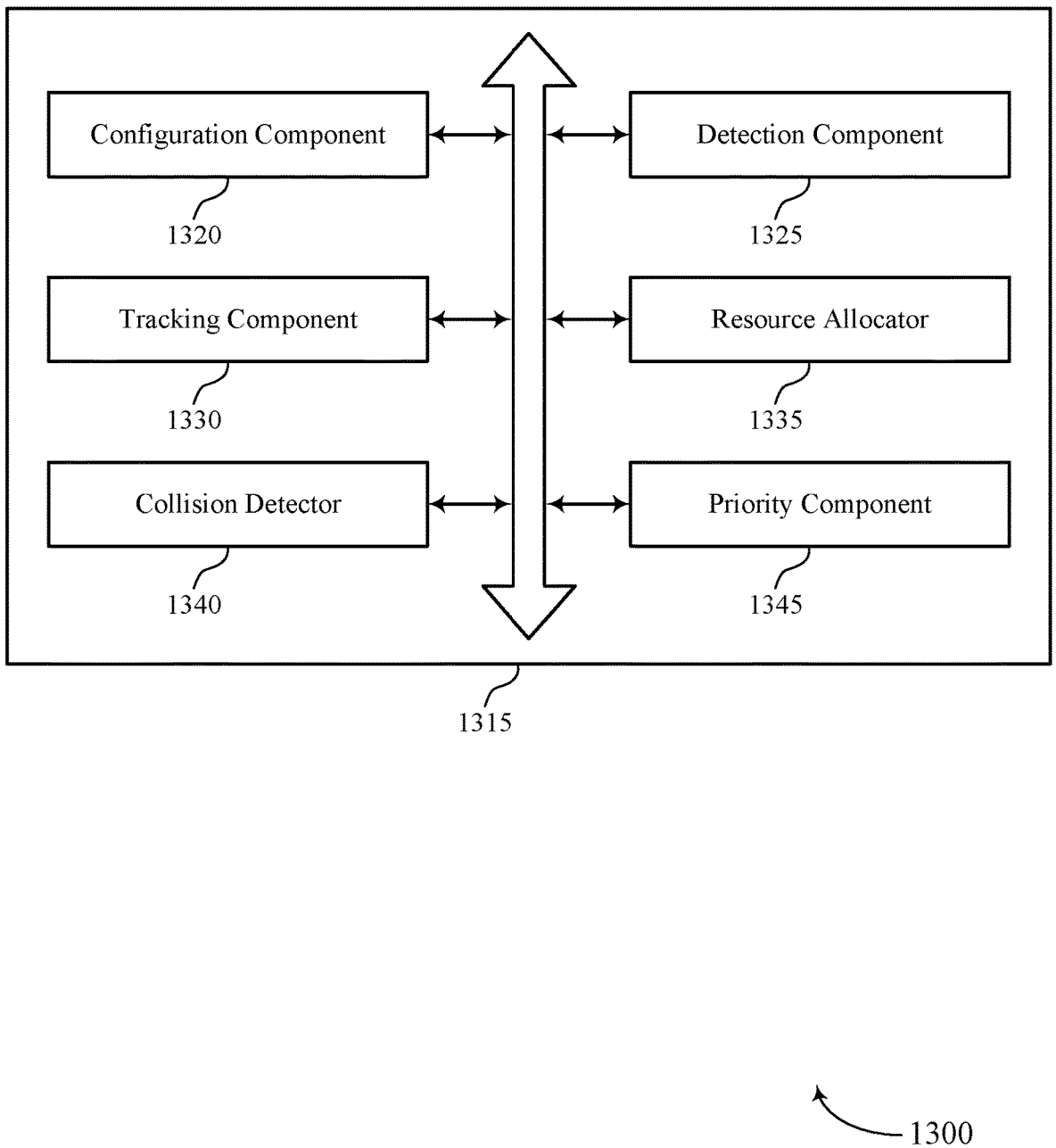

FIG. 13 shows a block diagram 1300 of a UE communications manager 1315 that supports configuration aspects of a tracking reference signal in New Radio in accordance with aspects of the present disclosure. The UE communications manager 1315 may be an example of aspects of a UE communications manager 1115, a UE communications manager 1215, or a UE communications manager 1415 described with reference to FIGS. 11, 12, and 14. The UE communications manager 1315 may include configuration component 1320, detection component 1325, tracking component 1330, resource allocator 1335, collision detector 1340, and priority component 1345. Each of these modules may communicate, directly or indirectly, with one another (e.g., via one or more buses).

Configuration component 1320 may receive configuration information indicating a first burst duration and a second burst duration for a TRS burst, the first burst duration being different from the second burst duration. Configuration component 1320 may determine, from the configuration information, a first burst duration and a second burst duration for the TRS transmission, and may determine, from the configuration information, that transmissions of TRS bursts are scheduled to alternate between the first burst duration and the second burst duration in each time interval of a set of time intervals. Configuration component 1320 may determine, from the configuration information, a set of burst durations and a corresponding time interval duration for each of the set of burst durations, the set of burst durations including the first and second burst durations.

Configuration component 1320 may determine, from the configuration information, a frequency offset parameter and tone spacing. In some cases, monitoring for the first TRS burst is based on the tone spacing. Configuration component 1320 may determine, from the configuration information, that the first burst duration corresponds to a first time interval and the second burst duration corresponds to a second time interval, the second time interval occurring after the first time interval. Configuration component 1320 may process the frequency offset parameter and the tone spacing to determine a location of at least one TRS tone of the TRS transmission within the frequency band relative to a reference frequency. In some cases, configuration component 1320 may process the frequency offset parameter to determine a first offset value corresponding to a first TTI and a second offset value corresponding to a second TTI, and receive configuration information indicating a frequency offset parameter. In some cases, determining, from the configuration information, a periodicity of a time interval and a time offset. In some cases, the frequency offset parameter indicates an offset in a number of resource elements. In some cases, the frequency offset parameter indicates a bandwidth part of a set of different bandwidth parts within a system bandwidth.

Detection component 1325 may detect a first TRS burst having the first burst duration and a second TRS burst having the second burst duration based on the configuration information, and may monitor, within each instance of the time interval, for a TRS burst having the first burst duration at a first location and for a TRS burst having the second burst duration at a second location corresponding to the offset. Detection component 1325 may monitor for one of the first TRS burst or the second TRS burst within the TTI based on the priority order, and may monitor for a set of TRS bursts based on the set of burst durations and the corresponding time interval durations, the set of TRS bursts including the first and second TRS bursts. Detection component 1325 may monitor for the first TRS burst based on the frequency offset parameter, and may monitor for a TRS tone of the TRS transmission within the first TTI corresponding to the first offset value and for a TRS tone of the TRS transmission within the second TTI corresponding to the second offset value. Detection component 1325 may detect a TRS transmission within a frequency band based on the frequency offset parameter, and may monitor for the TRS transmission having the first burst duration and a second TRS transmission having the second burst duration based on the configuration information.

Tracking component 1330 may perform resource tracking based on the detected first TRS burst and the second TRS burst and perform resource tracking based on the detected TRS transmission.

Resource allocator 1335 may determine, from the configuration information, that a first resource and a second resource have been allocated to the UE, where the first burst duration corresponds to the first resource and the second burst duration corresponds to the second resource.

Collision detector 1340 may determine that the first resource is scheduled to collide with the second resource during a TTI.

Priority component 1345 may determine, from the configuration information, a priority order of the first resource relative to the second resource and determine a priority order of the first resource relative to the second resource based on one or more rules.

Figure 14:
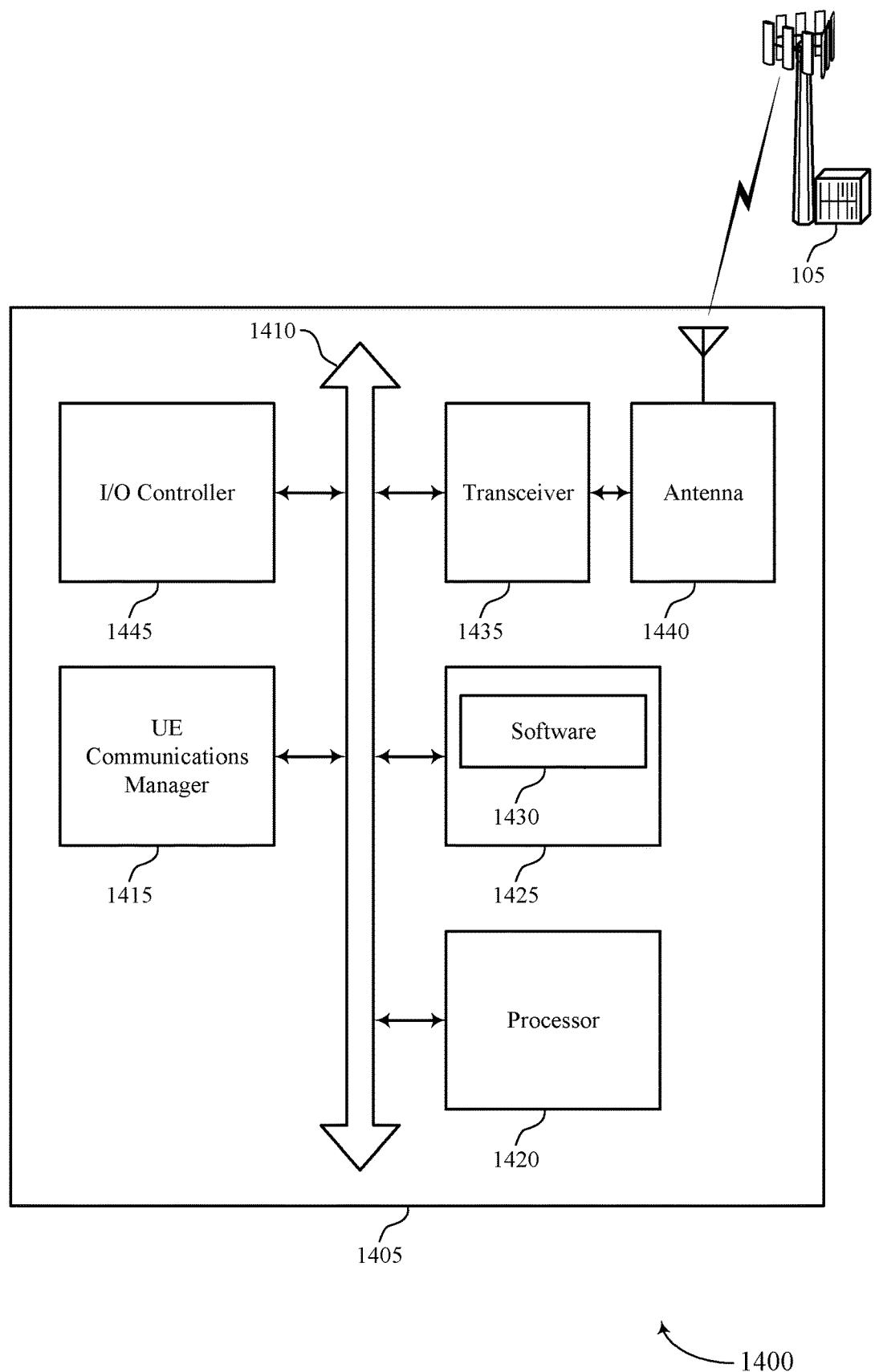
FIG. 14 illustrates a block diagram of a system including a UE that supports configuration aspects of a tracking reference signal in New Radio in accordance with aspects of the present disclosure.

FIG. 14 shows a diagram of a system 1400 including a device 1405 that supports configuration aspects of a tracking reference signal in New Radio in accordance with aspects of the present disclosure. Device 1405 may be an example of or include the components of wireless device 1105, wireless device 1205, or a UE 115 as described above, e.g., with reference to FIGS. 11 and 12. Device 1405 may include components for bi-directional voice and data communications including components for transmitting and receiving communications, including UE communications manager 1415, processor 1420, memory 1425, software 1430, transceiver 1435, antenna 1440, and I/O controller 1445. These components may be in electronic communication via one or more buses (e.g., bus 1410). Device 1405 may communicate wirelessly with one or more base stations 105.

Processor 1420 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting configuration aspects of a tracking reference signal in New Radio).

Memory 1425 may include random access memory (RAM) and read only memory (ROM). The memory 1425 may store computer-readable, computer-executable software 1430 including instructions that, when executed, cause the processor to perform various functions described herein. In some cases, the memory 1425 may contain, among other things, a basic input/output system (BIOS) which may control basic hardware or software operation such as the interaction with peripheral components or devices.

Software 1430 may include code to implement aspects of the present disclosure, including code to support configuration aspects of a tracking reference signal in New Radio. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, transceiver 1435 may represent a wireless transceiver and may communicate bi-directionally with another wireless transceiver. Transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. I/O controller 1445 may be implemented as part of a processor. In some examples, a user may interact with device 1405 via I/O controller 1445 or via hardware components controlled by I/O controller 1445.

Figure 15:
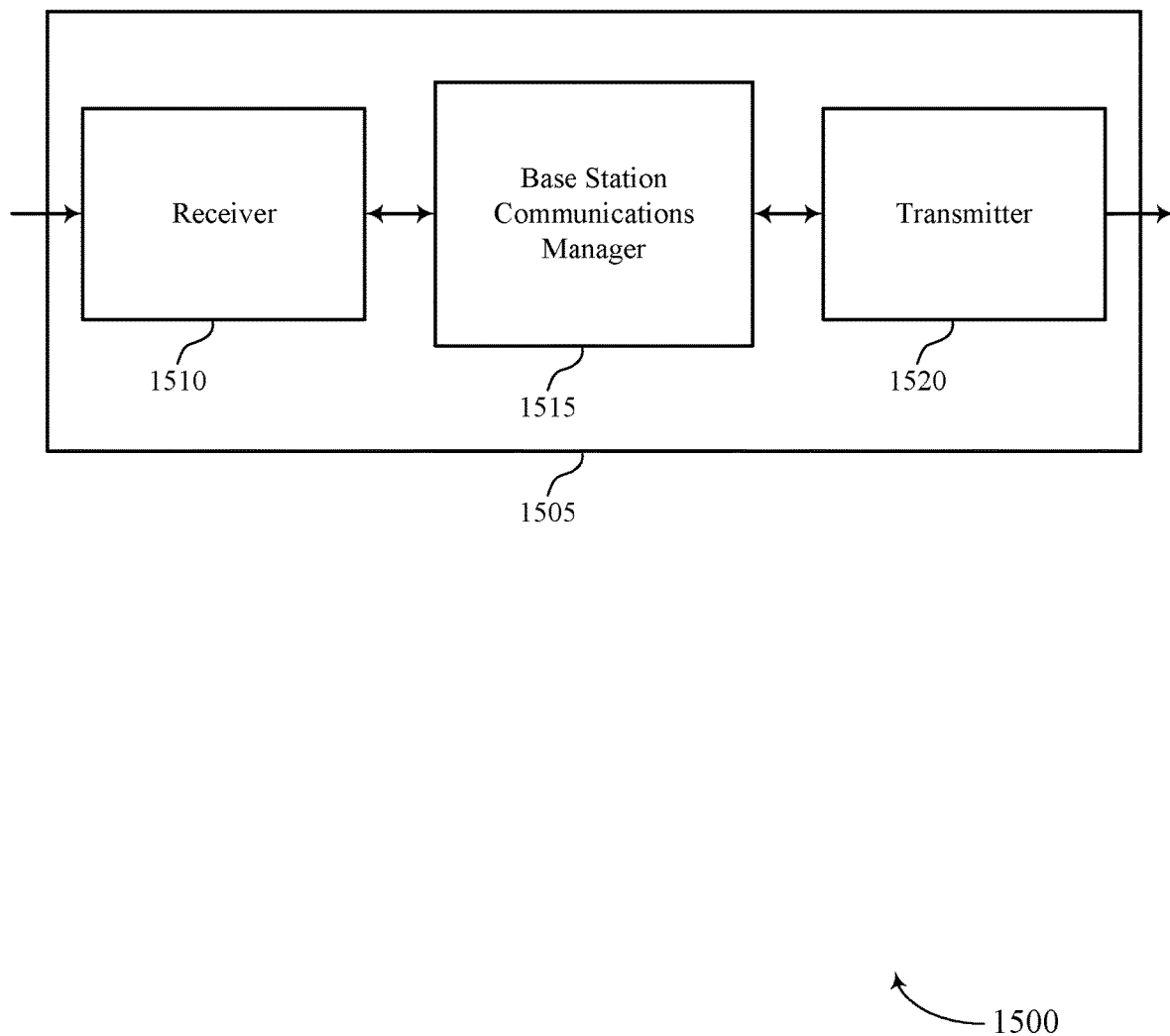
FIGS. 15 through 17 show block diagrams of a device that supports configuration aspects of a tracking reference signal in New Radio in accordance with aspects of the present disclosure.

FIG. 15 shows a block diagram 1500 of a wireless device 1505 that supports configuration aspects of a tracking reference signal in New Radio in accordance with aspects of the present disclosure. Wireless device 1505 may be an example of aspects of a base station 105 as described herein. Wireless device 1505 may include receiver 1510, base station communications manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to configuration aspects of a tracking reference signal in New Radio, etc.). Information may be passed on to other components of the device. The receiver 1510 may be an example of aspects of the transceiver 1835 described with reference to FIG. 18. The receiver 1510 may utilize a single antenna or a set of antennas.

Base station communications manager 1515 may be an example of aspects of the base station communications manager 1815 described with reference to FIG. 18.

Base station communications manager 1515 and/or at least some of its various sub-components may be implemented in hardware, software executed by a processor, firmware, or any combination thereof. If implemented in software executed by a processor, the functions of the base station communications manager 1515 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1515 and/or at least some of its various sub-components may be physically located at various positions, including being distributed such that portions of functions are implemented at different physical locations by one or more physical devices. In some examples, base station communications manager 1515 and/or at least some of its various sub-components may be a separate and distinct component in accordance with various aspects of the present disclosure. In other examples, base station communications manager 1515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1515 may select a first burst duration and a second burst duration for a TRS burst, the first burst duration being different from the second burst duration, transmit configuration information indicating the first burst duration and the second burst duration, and transmit a first TRS burst having the first burst duration and a second TRS burst having the second burst duration. The base station communications manager 1515 may also select a frequency offset parameter, transmit configuration information indicating the frequency offset parameter, and transmit a TRS transmission having a frequency offset corresponding to the frequency offset parameter.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1835 described with reference to FIG. 18. The transmitter 1520 may utilize a single antenna or a set of antennas.

Figure 16:
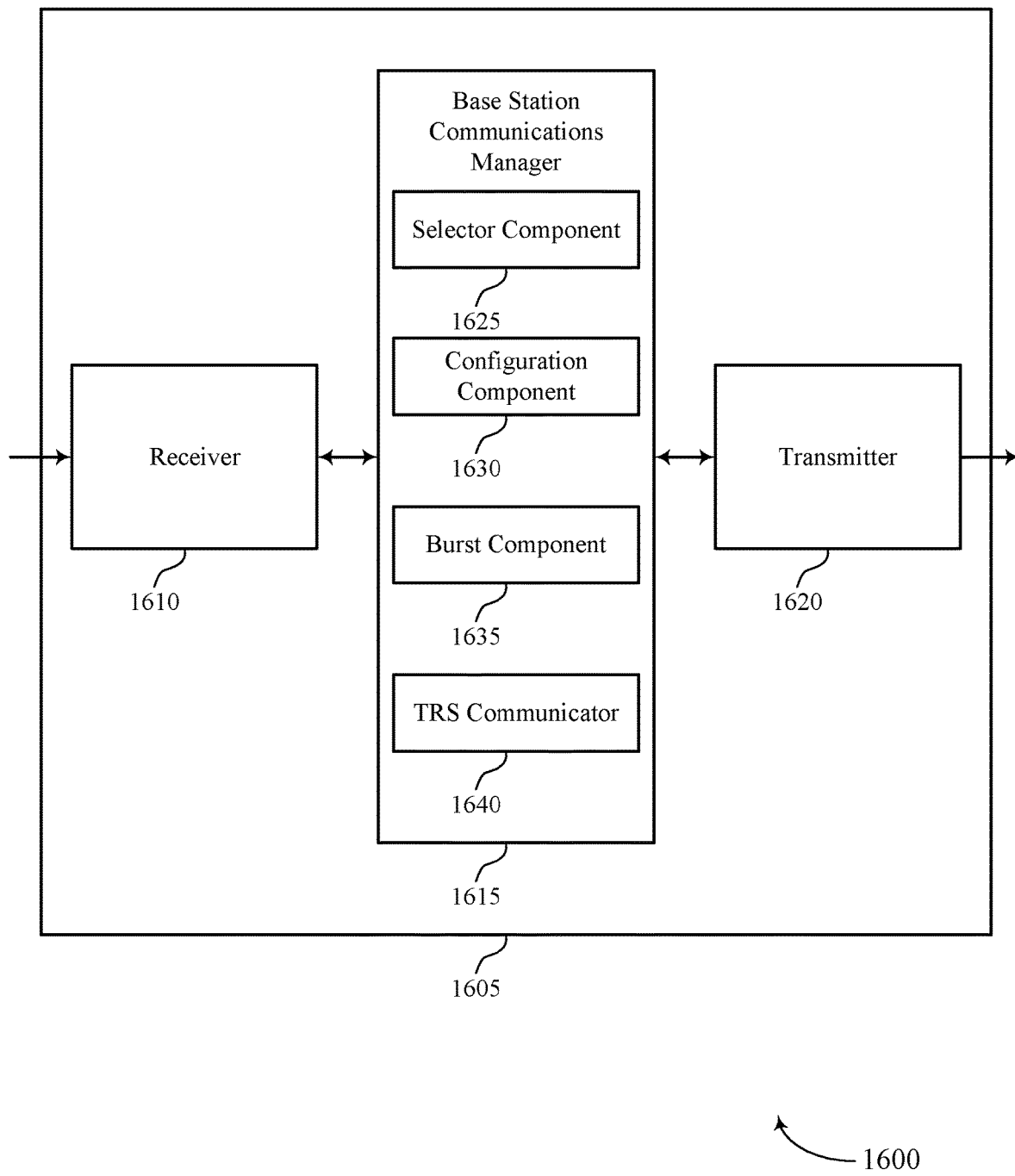

FIG. 16 shows a block diagram 1600 of a wireless device 1605 that supports configuration aspects of a tracking reference signal in New Radio in accordance with aspects of the present disclosure. Wireless device 1605 may be an example of aspects of a wireless device 1505 or a base station 105 as described with reference to FIG. 15. Wireless device 1605 may include receiver 1610, base station communications manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to configuration aspects of a tracking reference signal in New Radio, etc.). Information may be passed on to other components of the device. The receiver 1610 may be an example of aspects of the transceiver 1835 described with reference to FIG. 18. The receiver 1610 may utilize a single antenna or a set of antennas.

Base station communications manager 1615 may be an example of aspects of the base station communications manager 1815 described with reference to FIG. 18. Base station communications manager 1615 may also include selector component 1625, configuration component 1630, burst component 1635, and TRS communicator 1640.

Selector component 1625 may select a first burst duration and a second burst duration for a TRS burst, the first burst duration being different from the second burst duration, select a frequency offset parameter, and determine tone spacing for the TRS transmission, where the configuration information indicates the tone spacing. Selector component 1625 may determine an offset value for a set of symbol indexes, where the configuration information indicates the plurality of symbol indexes. In some cases, determining a first offset value corresponding to a first TTI and a second offset value corresponding to a second TTI, where the frequency offset parameter indicates the first offset value and the second offset value, where transmitting the TRS transmission includes: transmitting a TRS tone of the TRS transmission within the first TTI corresponding to the first offset value and a TRS tone of the TRS transmission within the second TTI corresponding to the second offset value. In some cases, the frequency offset parameter indicates an offset in a number of resource elements. In some cases, the frequency offset parameter indicates a bandwidth part of a set of different bandwidth parts within a system bandwidth.

Configuration component 1630 may transmit configuration information indicating the first burst duration and the second burst duration and transmit configuration information indicating the frequency offset parameter.

Burst component 1635 may transmit a first TRS burst having the first burst duration and a second TRS burst having the second burst duration. In some cases, transmitting the first TRS burst and the second TRS burst includes alternating between transmitting the first TRS burst and the second TRS burst in each time interval of a set of time intervals.

TRS communicator 1640 may transmit a TRS transmission having a frequency offset corresponding to the frequency offset parameter.

Transmitter 1620 may transmit signals generated by other components of the device. In some examples, transmitter 1620 may be collocated with a receiver 1610 in a transceiver module. For example, transmitter 1620 may be an example of aspects of the transceiver 1835 described with reference to FIG. 18. Transmitter 1620 may utilize a single antenna or a set of antennas.

Figure 17:
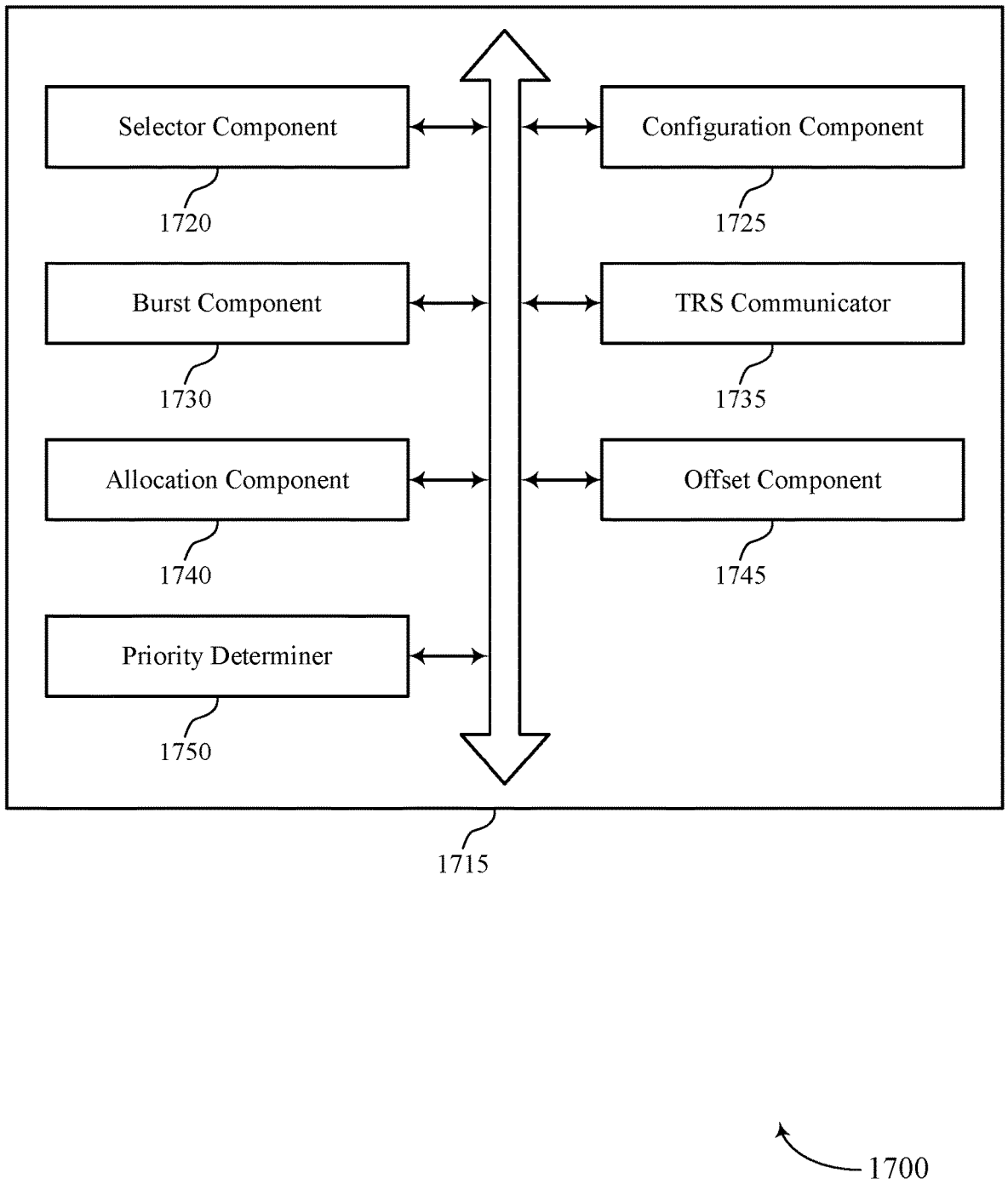

FIG. 17 shows a block diagram 1700 of a base station communications manager 1715 that supports configuration aspects of a tracking reference signal in New Radio in accordance with aspects of the present disclosure. The base station communications manager 1715 may be an example of aspects of a base station communications manager 1815 described with reference to FIGS. 15, 16, and 18. The base station communications manager 1715 may include selector component 1720, configuration component 1725, burst component 1730, TRS communicator 1735, allocation component 1740, offset component 1745, and priority determiner 1750. Each of these modules may communicate, directly or indirectly, with one another (e.g., via one or more buses).

Selector component 1720 may select a first burst duration and a second burst duration for a TRS burst, the first burst duration being different from the second burst duration, select a frequency offset parameter, and determine tone spacing for the TRS transmission, where the configuration information indicates the tone spacing. In some cases, determining a first offset value corresponding to a first TTI and a second offset value corresponding to a second TTI, where the frequency offset parameter indicates the first offset value and the second offset value, where transmitting the TRS transmission includes transmitting a TRS tone of the TRS transmission within the first TTI corresponding to the first offset value and a TRS tone of the TRS transmission within the second TTI corresponding to the second offset value. In some cases, the frequency offset parameter indicates an offset in a number of resource elements. In some cases, the frequency offset parameter indicates a bandwidth part of a set of different bandwidth parts within a system bandwidth.

Configuration component 1725 may transmit configuration information indicating the first burst duration and the second burst duration and transmit configuration information indicating the frequency offset parameter. Configuration component 1725 may determine a plurality of burst durations and a corresponding time interval duration for each of the plurality of burst durations, the plurality of burst durations including the first and second burst durations, wherein the configuration information indicates the plurality of burst durations and the corresponding time interval durations.

Burst component 1730 may transmit a first TRS burst having the first burst duration and a second TRS burst having the second burst duration. In some cases, transmitting the first TRS burst and the second TRS burst includes alternating between transmitting the first TRS burst and the second TRS burst in each time interval of a set of time intervals.

TRS communicator 1735 may transmit a TRS transmission having a frequency offset corresponding to the frequency offset parameter.

Allocation component 1740 may allocate a first resource and a second resource to the UE, where the configuration information indicates that each of the first resource and the second resource have been allocated to the UE.

Offset component 1745 may determine a time offset between the first resource and the second resource, where the configuration information indicates the time offset.

Priority determiner 1750 may determine a priority order of the first resource relative to the second resource, where the configuration information indicates the priority order.

Figure 18:
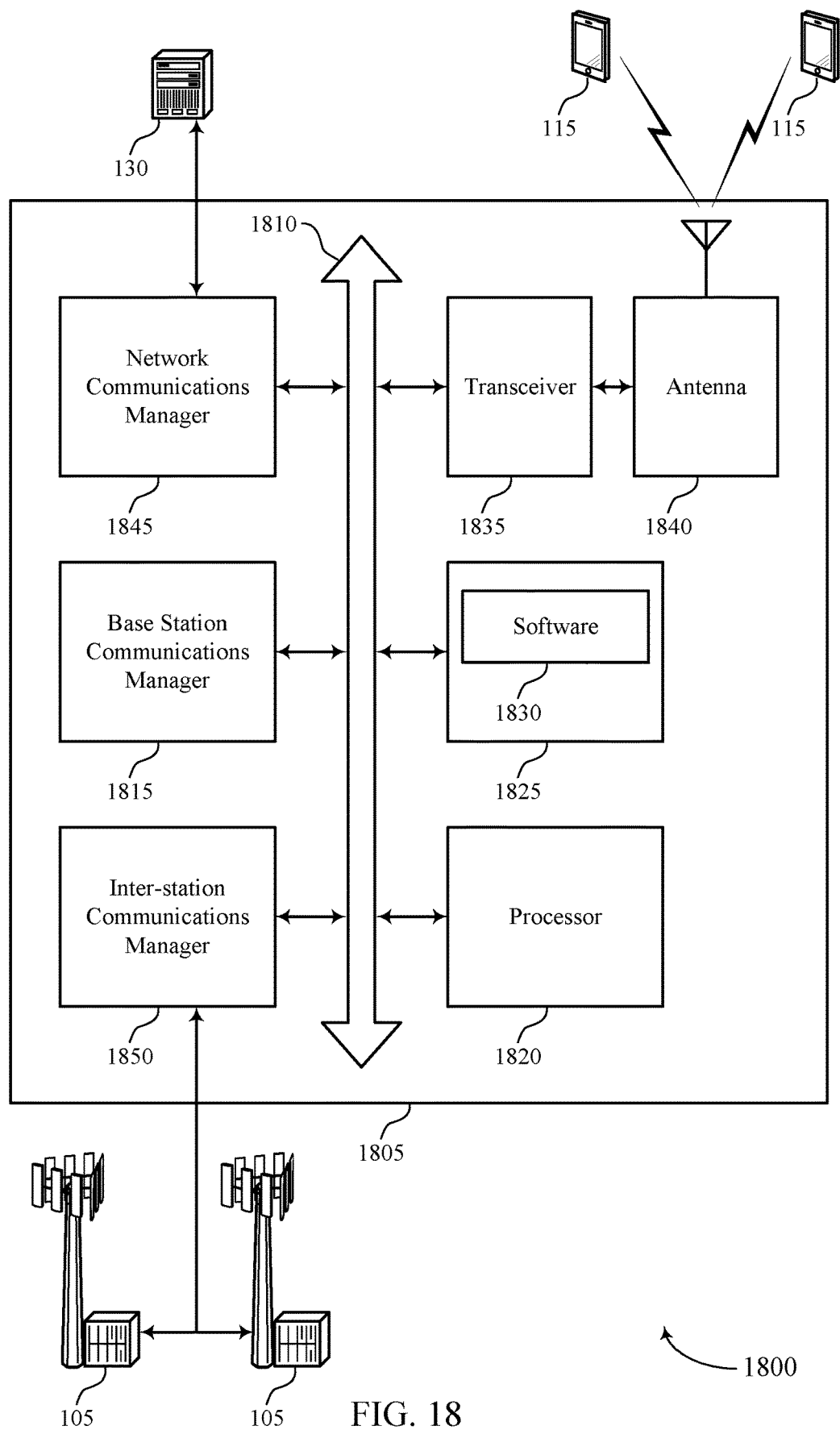
FIG. 18 illustrates a block diagram of a system including a base station that supports configuration aspects of a tracking reference signal in New Radio in accordance with aspects of the present disclosure.

FIG. 18 shows a diagram of a system 1800 including a device 1805 that supports configuration aspects of a tracking reference signal in New Radio in accordance with aspects of the present disclosure. Device 1805 may be an example of or include the components of base station 105 as described above, e.g., with reference to FIG. 1. Device 1805 may include components for bi-directional voice and data communications including components for transmitting and receiving communications, including base station communications manager 1815, processor 1820, memory 1825, software 1830, transceiver 1835, antenna 1840, network communications manager 1845, and inter-station communications manager 1850. These components may be in electronic communication via one or more buses (e.g., bus 1810). Device 1805 may communicate wirelessly with one or more UEs 115.

Processor 1820 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1820 may be configured to operate a memory array using a memory controller. In other cases, a memory controller may be integrated into processor 1820. Processor 1820 may be configured to execute computer-readable instructions stored in a memory to perform various functions (e.g., functions or tasks supporting configuration aspects of a tracking reference signal in New Radio).

Memory 1825 may include RAM and ROM. The memory 1825 may store computer-readable, computer-executable software 1830 including instructions that, when executed, cause the processor to perform various functions described herein. In some cases, the memory 1825 may contain, among other things, a BIOS which may control basic hardware or software operation such as the interaction with peripheral components or devices.

Software 1830 may include code to implement aspects of the present disclosure, including code to support configuration aspects of a tracking reference signal in New Radio. Software 1830 may be stored in a non-transitory computer-readable medium such as system memory or other memory. In some cases, the software 1830 may not be directly executable by the processor but may cause a computer (e.g., when compiled and executed) to perform functions described herein.

Transceiver 1835 may communicate bi-directionally, via one or more antennas, wired, or wireless links as described above. For example, the transceiver 1835 may represent a wireless transceiver and may communicate bi-directionally with another wireless transceiver. The transceiver 1835 may also include a modem to modulate the packets and provide the modulated packets to the antennas for transmission, and to demodulate packets received from the antennas.

In some cases, the wireless device may include a single antenna 1840. However, in some cases the device may have more than one antenna 1840, which may be capable of concurrently transmitting or receiving multiple wireless transmissions.

Network communications manager 1845 may manage communications with the core network (e.g., via one or more wired backhaul links). For example, the network communications manager 1845 may manage the transfer of data communications for client devices, such as one or more UEs 115.

Inter-station communications manager 1850 may manage communications with other base stations 105, and may include a controller or scheduler for controlling communications with UEs 115 in cooperation with other base stations 105. For example, the inter-station communications manager 1850 may coordinate scheduling for transmissions to UEs 115 for various interference mitigation techniques such as beamforming or joint transmission. In some examples, inter-station communications manager 1850 may provide an X2 interface within an LTE/LTE-A wireless communication network technology to provide communication between base stations 105.

Figure 19:
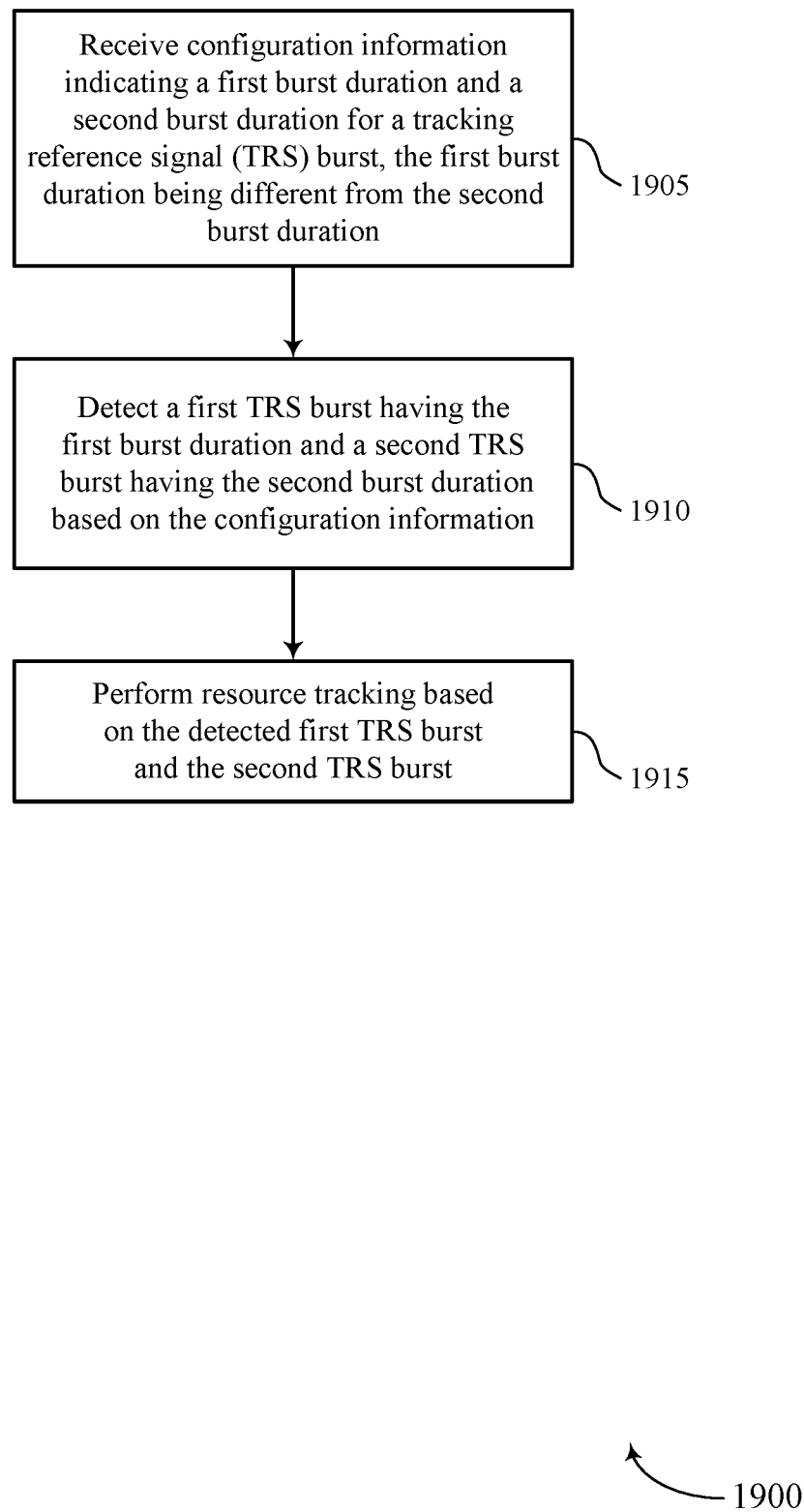
FIGS. 19 through 24 illustrate methods for configuration aspects of a tracking reference signal in New Radio in accordance with aspects of the present disclosure.

FIG. 19 shows a flowchart illustrating a method 1900 for configuration aspects of a tracking reference signal in New Radio in accordance with aspects of the present disclosure. The operations of method 1900 may be implemented by a UE 115 or its components as described herein. For example, the operations of method 1900 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At 1905 the UE 115 may receive configuration information indicating a first burst duration and a second burst duration for a TRS burst, the first burst duration being different from the second burst duration. The operations of 1905 may be performed according to the methods described herein. In certain examples, aspects of the operations of 1905 may be performed by a configuration component as described with reference to FIGS. 11 through 14.

At 1910 the UE 115 may detect a first TRS burst having the first burst duration and a second TRS burst having the second burst duration based at least in part on the configuration information. The operations of 1910 may be performed according to the methods described herein. In certain examples, aspects of the operations of 1910 may be performed by a detection component as described with reference to FIGS. 11 through 14.

At 1915 the UE 115 may perform resource tracking based at least in part on the detected first TRS burst and the second TRS burst. The operations of 1915 may be performed according to the methods described herein. In certain examples, aspects of the operations of 1915 may be performed by a tracking component as described with reference to FIGS. 11 through 14.

Figure 20:
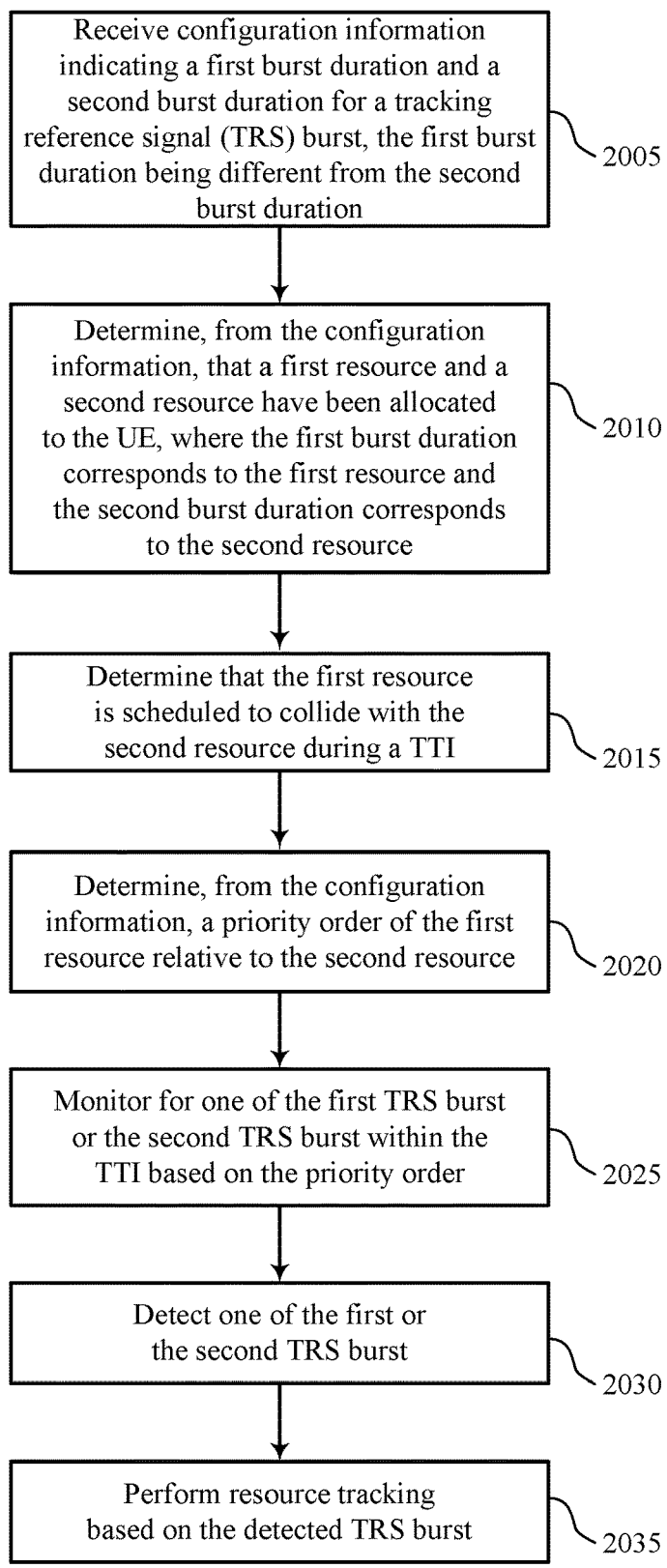

FIG. 20 shows a flowchart illustrating a method 2000 for configuration aspects of a tracking reference signal in New Radio in accordance with aspects of the present disclosure. The operations of method 2000 may be implemented by a UE 115 or its components as described herein. For example, the operations of method 2000 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At 2005 the UE 115 may receive configuration information indicating a first burst duration and a second burst duration for a TRS burst, the first burst duration being different from the second burst duration. For example, the first burst duration may be longer or shorter than the second burst duration. The operations of 2005 may be performed according to the methods described herein. In certain examples, aspects of the operations of 2005 may be performed by a configuration component as described with reference to FIGS. 11 through 14.

At 2010 the UE 115 may determine, from the configuration information, that a first resource and a second resource have been allocated to the UE, wherein the first burst duration corresponds to the first resource and the second burst duration corresponds to the second resource. The operations of 2010 may be performed according to the methods described herein. In certain examples, aspects of the operations of 2010 may be performed by a configuration component as described with reference to FIGS. 11 through 14.

At 2015 the UE 115 may determine that the first resource is scheduled to collide with the second resource during a TTI. The operations of 2015 may be performed according to the methods described herein. In certain examples, aspects of the operations of 2015 may be performed by a collision detector as described with reference to FIGS. 11 through 14.

At 2020 the UE 115 may determine, from the configuration information, a priority order of the first resource relative to the second resource. The operations of 2020 may be performed according to the methods described herein. In certain examples, aspects of the operations of 2020 may be performed by a priority component as described with reference to FIGS. 11 through 14.

At 2025 the UE 115 may monitor for one of the first TRS burst or the second TRS burst within the TTI based at least in part on the priority order. The operations of 2025 may be performed according to the methods described herein. In certain examples, aspects of the operations of 2025 may be performed by a detection component as described with reference to FIGS. 11 through 14.

At 2030 the UE 115 may detect one of the first TRS burst or the second TRS burst. The operations of 2030 may be performed according to the methods described herein. In certain examples, aspects of the operations of 2030 may be performed by a detection component as described with reference to FIGS. 11 through 14.

At 2035 the UE 115 may perform resource tracking based at least in part on the detected TRS burst. The operations of 2035 may be performed according to the methods described herein. In certain examples, aspects of the operations of 2035 may be performed by a tracking component as described with reference to FIGS. 11 through 14.

Figure 21:
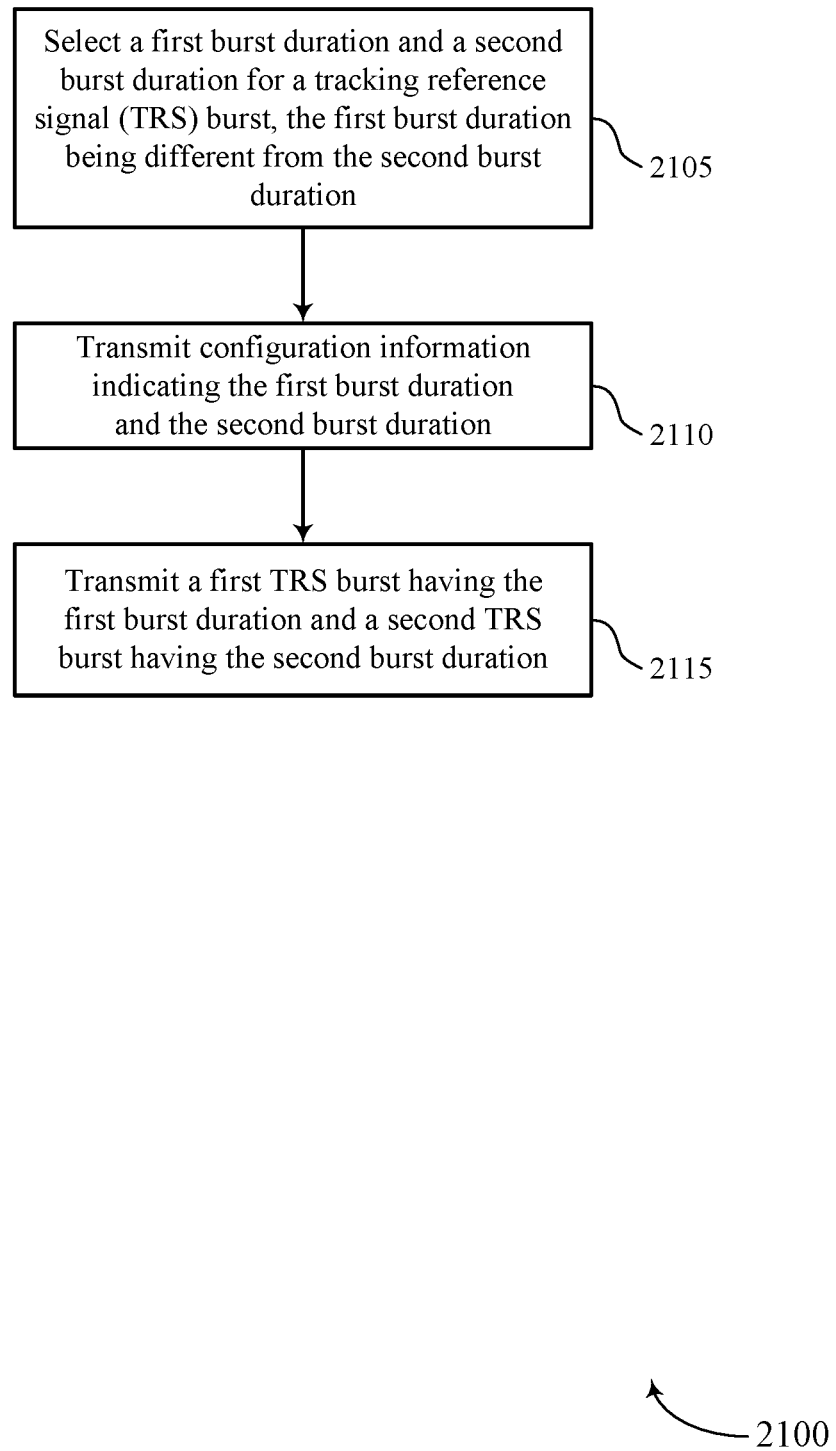

FIG. 21 shows a flowchart illustrating a method 2100 for configuration aspects of a tracking reference signal in New Radio in accordance with aspects of the present disclosure. The operations of method 2100 may be implemented by a base station 105 or its components as described herein. For example, the operations of method 2100 may be performed by a base station communications manager as described with reference to FIGS. 15 through 18. In some examples, a base station 105 may execute a set of codes to control the functional elements of the device to perform the functions described below. Additionally or alternatively, the base station 105 may perform aspects of the functions described below using special-purpose hardware.

At 2105 the base station 105 may select a first burst duration and a second burst duration for a TRS burst, the first burst duration being different from the second burst duration. The operations of 2105 may be performed according to the methods described herein. In certain examples, aspects of the operations of 2105 may be performed by a selector component as described with reference to FIGS. 15 through 18.

At 2110 the base station 105 may transmit configuration information indicating the first burst duration and the second burst duration. The operations of 2110 may be performed according to the methods described herein. In certain examples, aspects of the operations of 2110 may be performed by a configuration component as described with reference to FIGS. 15 through 18.

At 2115 the base station 105 may transmit a first TRS burst having the first burst duration and a second TRS burst having the second burst duration. The operations of 2115 may be performed according to the methods described herein. In certain examples, aspects of the operations of 2115 may be performed by a burst component as described with reference to FIGS. 15 through 18.

Figure 22:
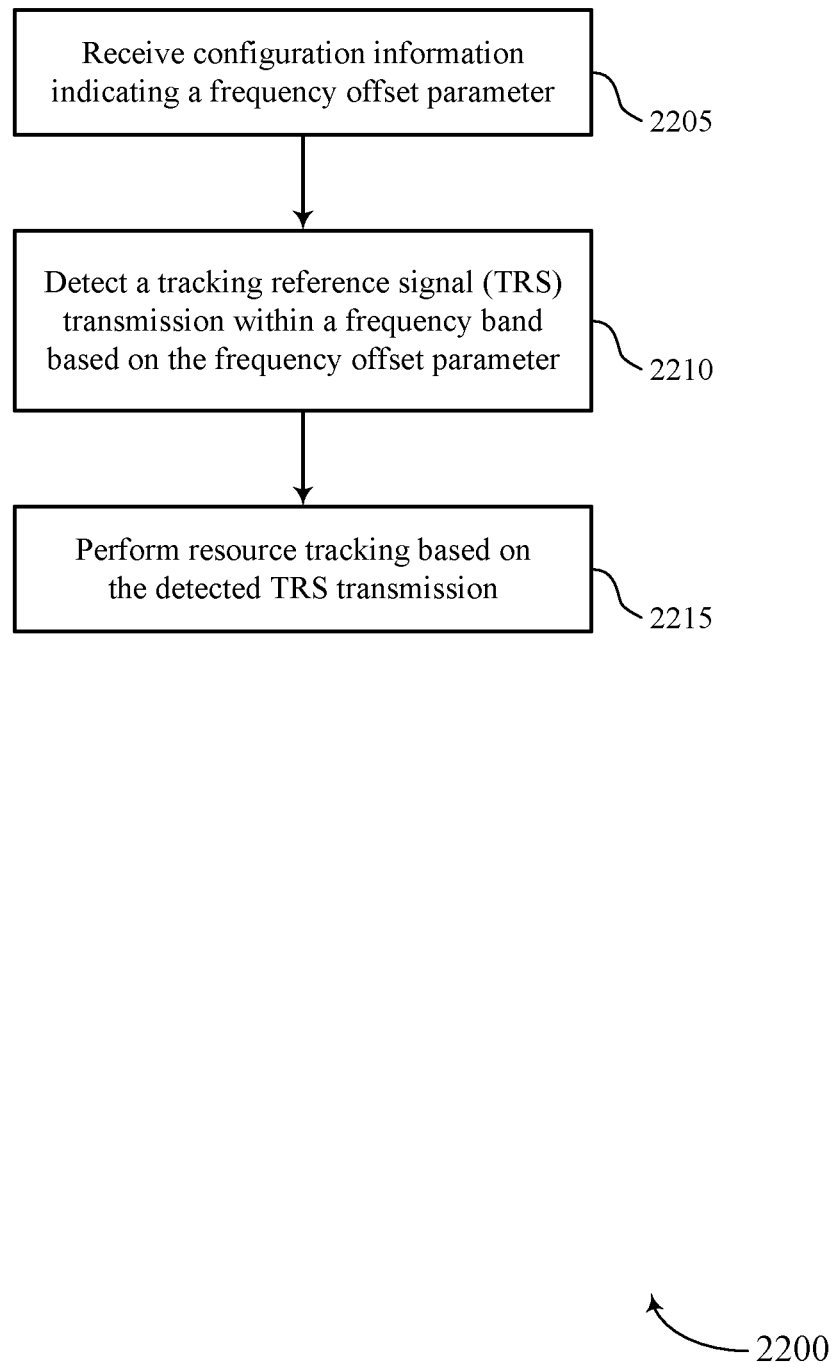

FIG. 22 shows a flowchart illustrating a method 2200 for configuration aspects of a tracking reference signal in New Radio in accordance with aspects of the present disclosure. The operations of method 2200 may be implemented by a UE 115 or its components as described herein. For example, the operations of method 2200 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At 2205 the UE 115 may receive configuration information indicating a frequency offset parameter. The operations of 2205 may be performed according to the methods described herein. In certain examples, aspects of the operations of 2205 may be performed by a configuration component as described with reference to FIGS. 11 through 14.

At 2210 the UE 115 may detect a TRS transmission within a frequency band based at least in part on the frequency offset parameter. The operations of 2210 may be performed according to the methods described herein. In certain examples, aspects of the operations of 2210 may be performed by a detection component as described with reference to FIGS. 11 through 14.

At 2215 the UE 115 may perform resource tracking based at least in part on the detected TRS transmission. The operations of 2215 may be performed according to the methods described herein. In certain examples, aspects of the operations of 2215 may be performed by a tracking component as described with reference to FIGS. 11 through 14.

Figure 23:
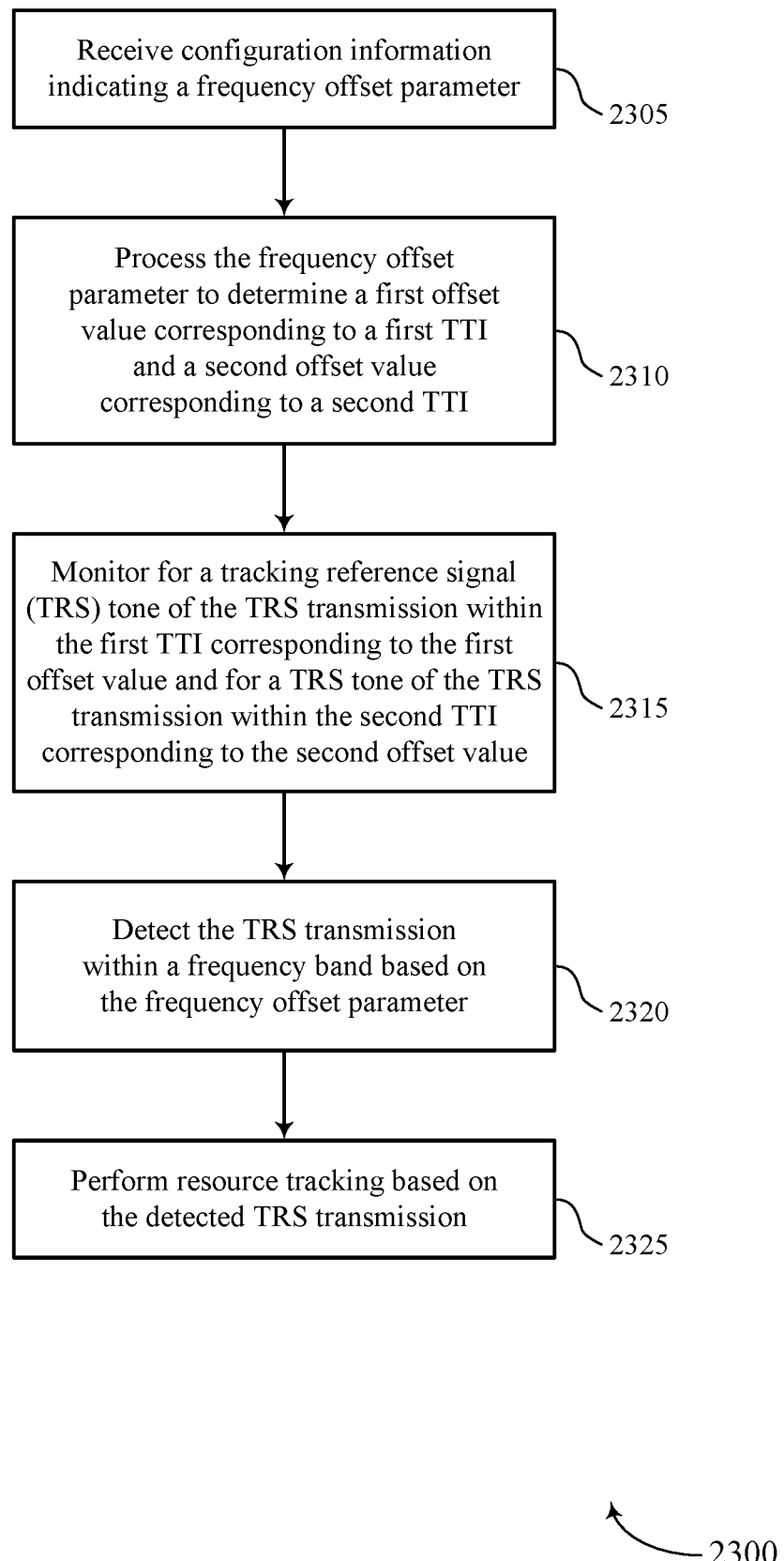

FIG. 23 shows a flowchart illustrating a method 2300 for configuration aspects of a tracking reference signal in New Radio in accordance with aspects of the present disclosure. The operations of method 2300 may be implemented by a UE 115 or its components as described herein. For example, the operations of method 2300 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At 2305 the UE 115 may receive configuration information indicating a frequency offset parameter. The operations of 2305 may be performed according to the methods described herein. In certain examples, aspects of the operations of 2305 may be performed by a configuration component as described with reference to FIGS. 11 through 14.

At 2310 the UE 115 may process the frequency offset parameter to determine a first offset value corresponding to a first TTI and a second offset value corresponding to a second TTI. The operations of 2310 may be performed according to the methods described herein. In certain examples, aspects of the operations of 2310 may be performed by a configuration component as described with reference to FIGS. 11 through 14.

At 2315 the UE 115 may monitor for a TRS tone of the TRS transmission within the first TTI corresponding to the first offset value and for a TRS tone of the TRS transmission within the second TTI corresponding to the second offset value. The operations of 2315 may be performed according to the methods described herein. In certain examples, aspects of the operations of 2315 may be performed by a detection component as described with reference to FIGS. 11 through 14.

At 2320 the UE 115 may detect the TRS transmission within a frequency band based at least in part on the frequency offset parameter. The operations of 2320 may be performed according to the methods described herein. In certain examples, aspects of the operations of 2320 may be performed by a detection component as described with reference to FIGS. 11 through 14.

At 2325 the UE 115 may perform resource tracking based at least in part on the detected TRS transmission. The operations of 2325 may be performed according to the methods described herein. In certain examples, aspects of the operations of 2325 may be performed by a tracking component as described with reference to FIGS. 11 through 14.

Figure 24:
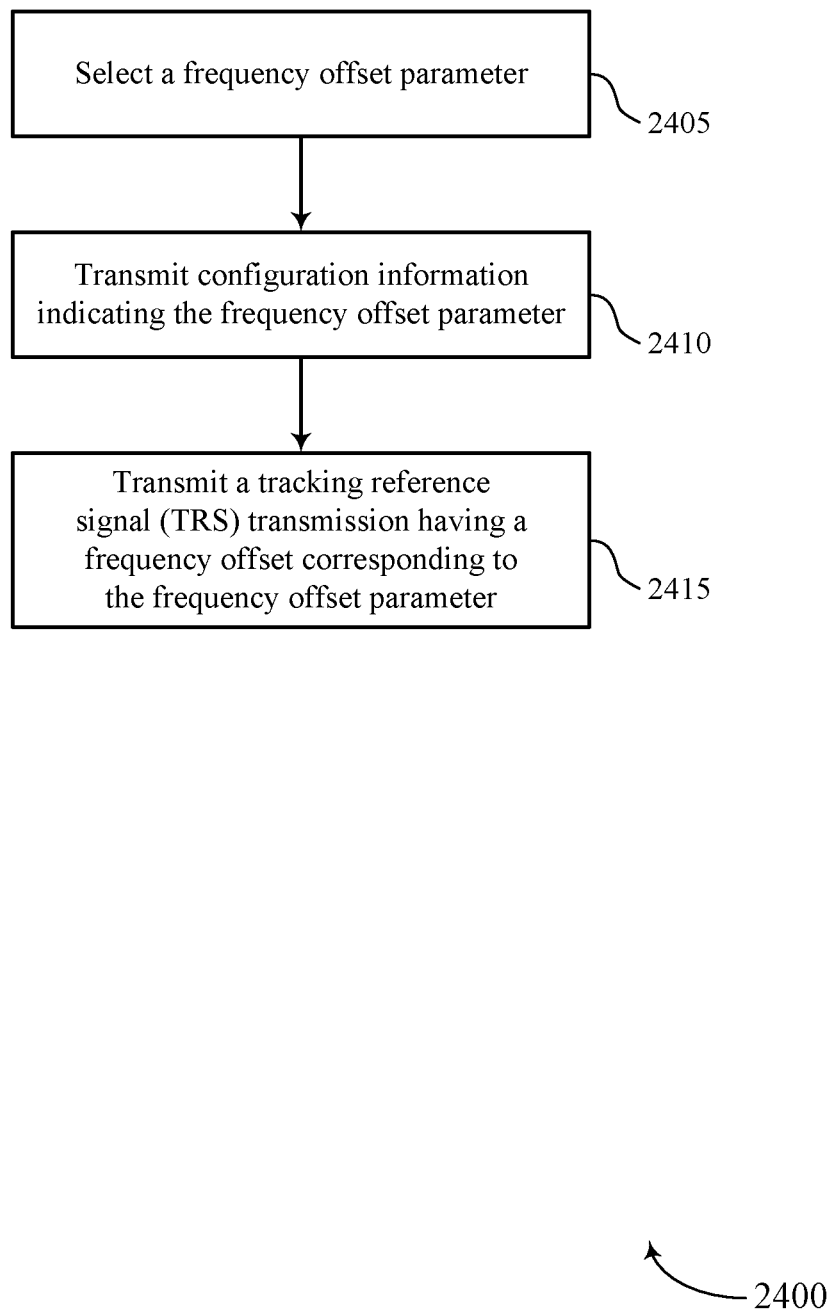

FIG. 24 shows a flowchart illustrating a method 2400 for configuration aspects of a tracking reference signal in New Radio in accordance with aspects of the present disclosure. The operations of method 2400 may be implemented by a base station 105 or its components as described herein. For example, the operations of method 2400 may be performed by a base station communications manager as described with reference to FIGS. 15 through 18. In some examples, a base station 105 may execute a set of codes to control the functional elements of the device to perform the functions described below. Additionally or alternatively, the base station 105 may perform aspects of the functions described below using special-purpose hardware.

At 2405 the base station 105 may select a frequency offset parameter. The operations of 2405 may be performed according to the methods described herein. In certain examples, aspects of the operations of 2405 may be performed by a selector component as described with reference to FIGS. 15 through 18.

At 2410 the base station 105 may transmit configuration information indicating the frequency offset parameter. The operations of 2410 may be performed according to the methods described herein. In certain examples, aspects of the operations of 2410 may be performed by a configuration component as described with reference to FIGS. 15 through 18.

At 2415 the base station 105 may transmit a TRS transmission having a frequency offset corresponding to the frequency offset parameter. The operations of 2415 may be performed according to the methods described herein. In certain examples, aspects of the operations of 2415 may be performed by a TRS communicator as described with reference to FIGS. 15 through 18.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional or future processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
   receiving configuration information indicating a frequency offset parameter;
   detecting a tracking reference signal (TRS) transmission within a frequency band based at least in part on the frequency offset parameter; and
   performing resource tracking based at least in part on the detected TRS transmission.

2. The method of claim 1, further comprising:
determining, from the configuration information, tone spacing; and
processing the frequency offset parameter and the tone spacing to determine a location of at least one TRS tone of the TRS transmission within the frequency band relative to a reference frequency.

3. The method of claim 1, further comprising:
processing the frequency offset parameter to determine a first offset value corresponding to a first transmission time interval (TTI) and a second offset value corresponding to a second TTI; and
monitoring for a TRS tone of the TRS transmission within the first TTI corresponding to the first offset value and for a TRS tone of the TRS transmission within the second TTI corresponding to the second offset value.

4. The method of claim 1, wherein the frequency offset parameter indicates an offset in a number of resource elements.

5. The method of claim 1, wherein the frequency offset parameter indicates a bandwidth part of a plurality of different bandwidth parts within a system bandwidth.

6. The method of claim 1, further comprising:
determining, from the configuration information, a first burst duration and a second burst duration for the TRS transmission; and
monitoring for the TRS transmission having the first burst duration and a second TRS transmission having the second burst duration based at least in part on the configuration information.

7. The method of claim 1, further comprising:
determining, from the frequency offset parameter, an offset value for a plurality of symbol indexes; and
monitoring, at a plurality of respective symbol periods corresponding to the plurality of symbol indexes, for a TRS tone of the TRS transmission.

8. A method for wireless communication by a base station, comprising:
selecting a frequency offset parameter;
transmitting configuration information indicating the frequency offset parameter; and
transmitting a tracking reference signal (TRS) transmission having a frequency offset corresponding to the frequency offset parameter.

9. The method of claim 8, further comprising:
determining tone spacing for the TRS transmission, wherein the configuration information indicates the tone spacing.

10. The method of claim 8, wherein determining a first offset value corresponding to a first transmission time interval (TTI) and a second offset value corresponding to a second TTI, wherein the frequency offset parameter indicates the first offset value and the second offset value, wherein transmitting the TRS transmission comprises:
transmitting a TRS tone of the TRS transmission within the first TTI corresponding to the first offset value and a TRS tone of the TRS transmission within the second TTI corresponding to the second offset value.

11. The method of claim 10, wherein the frequency offset parameter indicates an offset in a number of resource elements.

12. The method of claim 10, wherein the frequency offset parameter indicates a bandwidth part of a plurality of different bandwidth parts within a system bandwidth.

13. The method of claim 10, further comprising:
determining an offset value for a plurality of symbol indexes, wherein the configuration information indicates the plurality of symbol indexes.

14. An apparatus for wireless communication, comprising:
a processor;
memory in electronic communication with the processor; and
instructions stored in the memory and executable by the processor to cause the apparatus to:
receive configuration information indicating a frequency offset parameter;
detect a tracking reference signal (TRS) transmission within a frequency band based at least in part on the frequency offset parameter; and
perform resource tracking based at least in part on the detected TRS transmission.

15. The apparatus of claim 14, wherein the instructions are further executable by the processor to cause the apparatus to:
determine, from the configuration information, tone spacing; and
process the frequency offset parameter and the tone spacing to determine a location of at least one TRS tone of the TRS transmission within the frequency band relative to a reference frequency.

16. The apparatus of claim 14, wherein the instructions are further executable by the processor to cause the apparatus to:
process the frequency offset parameter to determine a first offset value corresponding to a first transmission time interval (TTI) and a second offset value corresponding to a second TTI; and
monitor for a TRS tone of the TRS transmission within the first TTI corresponding to the first offset value and for a TRS tone of the TRS transmission within the second TTI corresponding to the second offset value.

17. An apparatus for wireless communication, comprising:
a processor;
memory in electronic communication with the processor; and
instructions stored in the memory and executable by the processor to cause the apparatus to:
select a frequency offset parameter;
transmit configuration information indicating the frequency offset parameter; and
transmit a tracking reference signal (TRS) transmission having a frequency offset corresponding to the frequency offset parameter.

18. The apparatus of claim 17, wherein the instructions are further executable by the processor to cause the apparatus to:
determine tone spacing for the TRS transmission, wherein the configuration information indicates the tone spacing.

19. The apparatus of claim 17, wherein the instructions are further executable by the processor to cause the apparatus to:
determine a first offset value corresponding to a first transmission time interval (TTI) and a second offset value corresponding to a second TTI, wherein the frequency offset parameter indicates the first offset value and the second offset value, wherein the instruction for transmitting the TRS transmission are executable by the processor to cause the apparatus to:

transmit a TRS tone of the TRS transmission within the first TTI corresponding to the first offset value and a TRS tone of the TRS transmission within the second TTI corresponding to the second offset value.

* * * * *